(12) United States Patent
Yata

(10) Patent No.: US 7,256,817 B2
(45) Date of Patent: Aug. 14, 2007

(54) FOLLOWING DEVICE

(75) Inventor: Kunio Yata, Saitama (JP)

(73) Assignee: Fujinon Corporation, Tokyo (JP)

( * ) Notice: Subject to any disclaimer, the term of this patent is extended or adjusted under 35 U.S.C. 154(b) by 931 days.

(21) Appl. No.: 09/983,588

(22) Filed: Oct. 25, 2001

(65) Prior Publication Data
US 2002/0051057 A1 May 2, 2002

(30) Foreign Application Priority Data

| Oct. 26, 2000 | (JP) | .............................. 2000-327617 |
| Nov. 29, 2000 | (JP) | .............................. 2000-363392 |
| Nov. 29, 2000 | (JP) | .............................. 2000-363393 |

(51) Int. Cl.
*H04N 7/18* (2006.01)

(52) U.S. Cl. ...................................... 348/143; 348/169

(58) Field of Classification Search ................ 340/541; 348/143, 169–172; 382/103; 396/429; *H04N 7/18*
See application file for complete search history.

(56) References Cited

U.S. PATENT DOCUMENTS

| 4,805,018 | A | * | 2/1989 | Nishimura et al. | ......... 348/172 |
| 5,473,369 | A | * | 12/1995 | Abe | ............................ 348/169 |
| 5,519,669 | A | * | 5/1996 | Ross et al. | ................... 340/541 |
| 5,923,365 | A | * | 7/1999 | Tamir et al. | ................. 348/169 |
| 6,462,773 | B1 | * | 10/2002 | Koga | ......................... 348/143 |
| 6,507,366 | B1 | * | 1/2003 | Lee | ............................. 348/170 |
| 6,690,412 | B1 | * | 2/2004 | Higo | .......................... 348/143 |
| 6,766,035 | B1 | * | 7/2004 | Gutta | ......................... 382/103 |

| 2001/0002843 | A1 | | 6/2001 | Yata | |
| 2001/0035907 | A1 | * | 11/2001 | Broemmelsiek | ............ 348/169 |
| 2002/0090217 | A1 | * | 7/2002 | Limor et al. | ................. 396/429 |

FOREIGN PATENT DOCUMENTS

| DE | 19701186 A1 | 1/1997 |
| JP | 59-208983 | 11/1984 |
| JP | A59-208983 | 11/1984 |
| JP | 09186927 A | 7/1997 |
| JP | A2000-175101 | 6/2000 |
| JP | 2001-285850 | 10/2001 |

* cited by examiner

*Primary Examiner*—Young Lee
(74) *Attorney, Agent, or Firm*—Birch, Stewart, Kolasch & Birch, LLP

(57) ABSTRACT

In the following device, at the time of pan/tilt movement of a pan head, images #1 to #3 for three frames shot by a camera are sequentially taken in into an image memory of an image processing device. And, processing of an image processing processor as well as a CPU compares the image #1 with the image #2 and the image #1 with the image #3 respectively so as to extract an image of an moving object so as to detect moving velocity of the moving object based on the image of this extracted moving object. When the moving velocity of the moving object is detected, a command signal to cause the pan head to pan/tilt at the moving of that moving object is given to a pan head controller by the CPU. This moves the pan head in the pan/tilt direction at the moving velocity of the moving object. Thus, detection of the moving velocity of the moving object from the shooting image of the camera and control of the moving velocity of the pan head based on the detected moving velocity of the moving object enables following on the moving object without fail.

2 Claims, 23 Drawing Sheets

F I G. 1 0
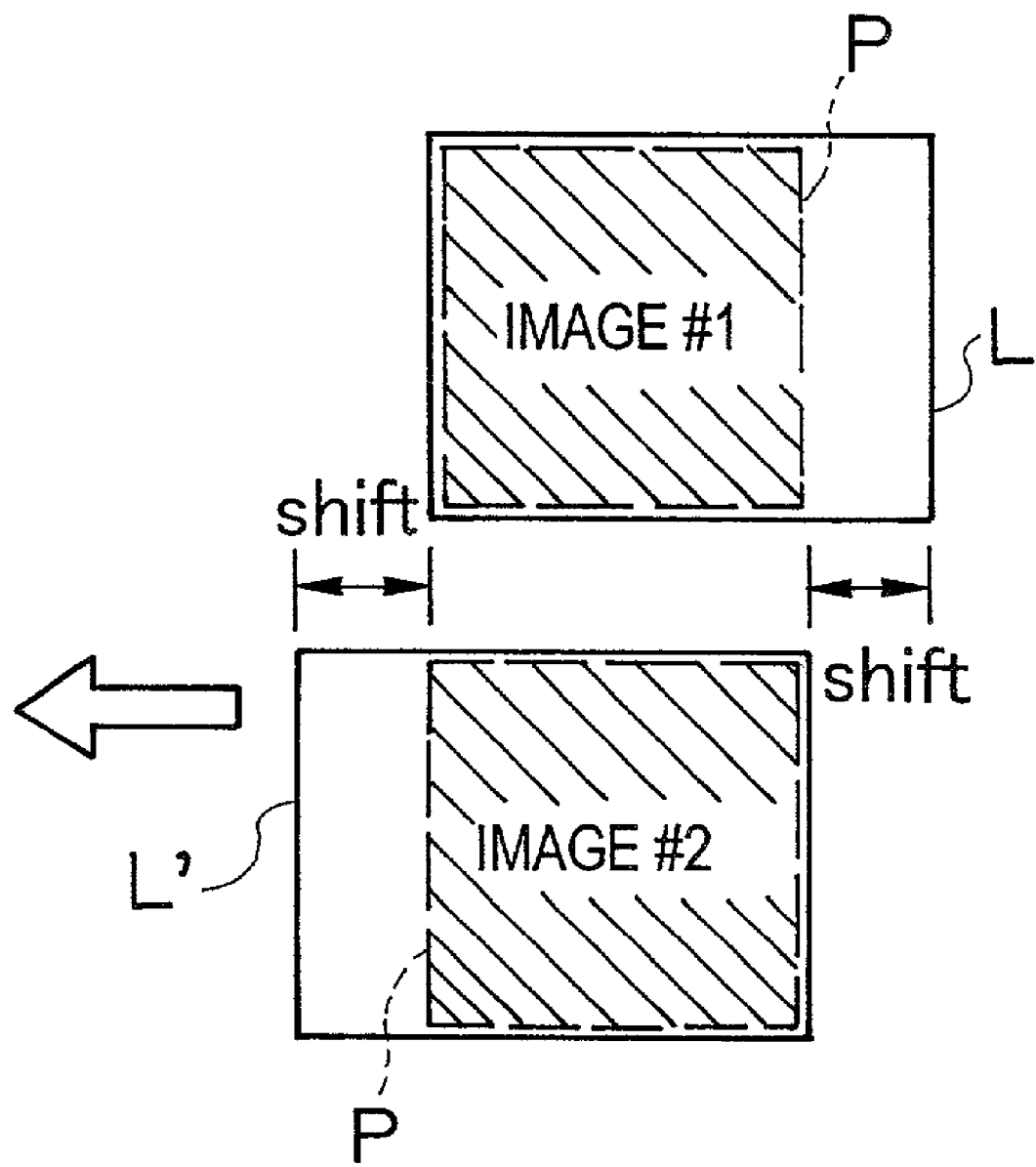

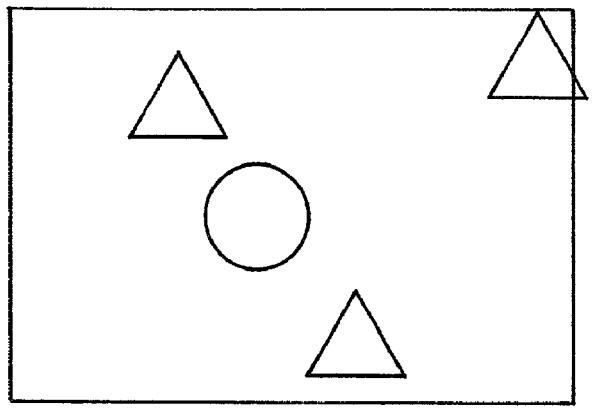
F I G. 1 1(A)
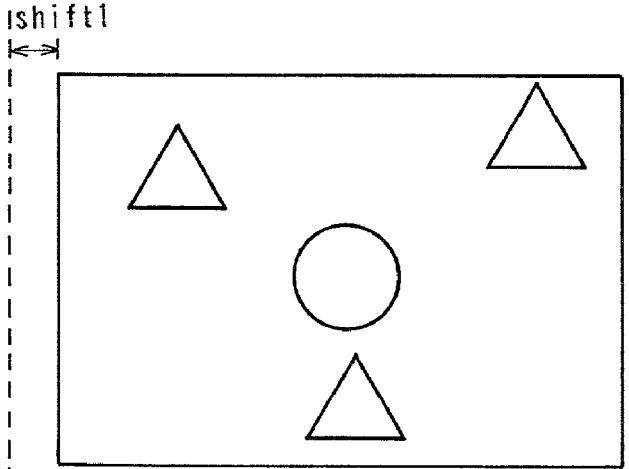
F I G. 1 1(B)
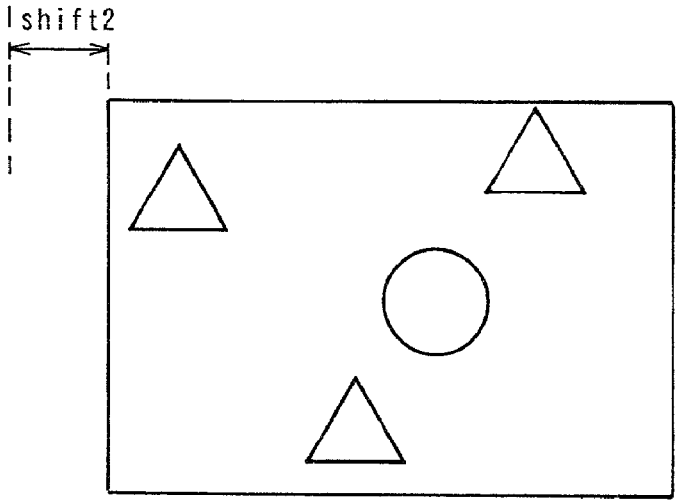
F I G. 1 1(C)

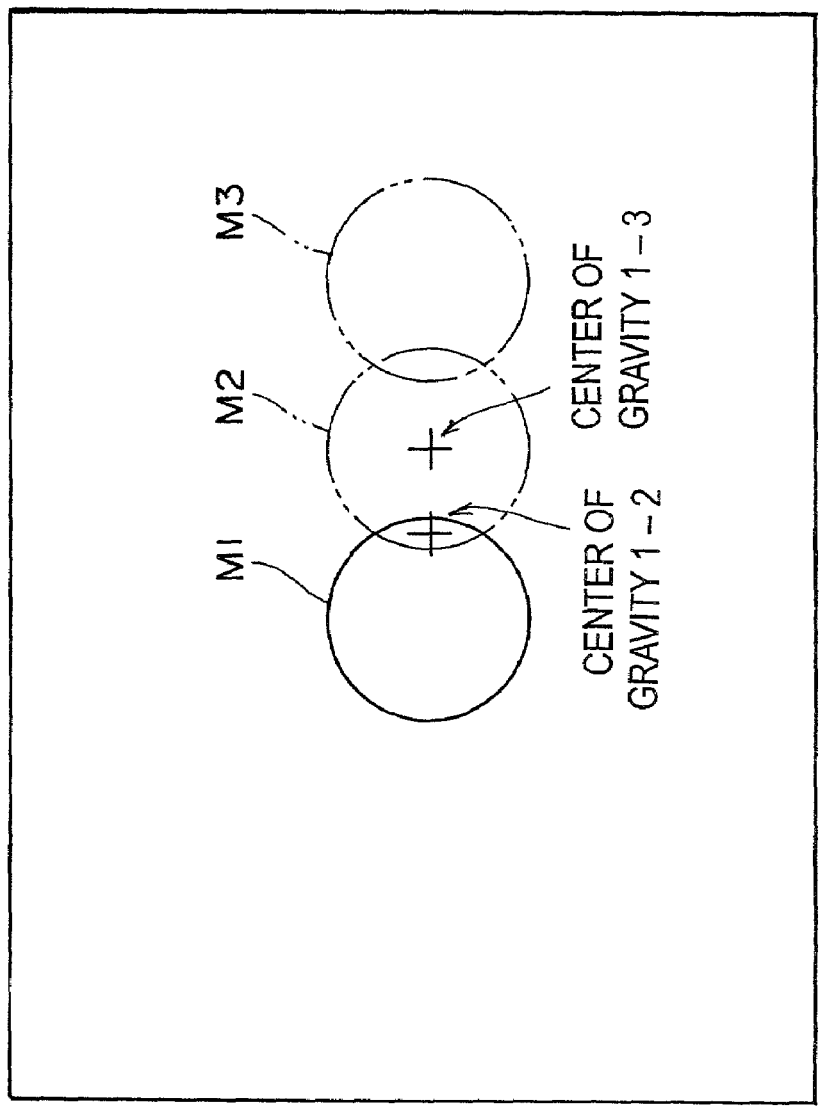

FIG. 13

| PAN SPEED \ CONTROL-VOLTAGE | 0 | 0.5 | 1 | 1.5 | 2 | 2.5 | ..... | 5 |
|---|---|---|---|---|---|---|---|---|
| 2°/s | shift | --- | --- | --- | --- | --- | | --- |
| 4°/s | --- | --- | --- | --- | --- | --- | | --- |
| 6°/s | --- | --- | --- | --- | --- | --- | | --- |
| ... | | | | | | | | |
| 15°/s | --- | --- | --- | --- | --- | --- | | --- |

F I G. 1 4
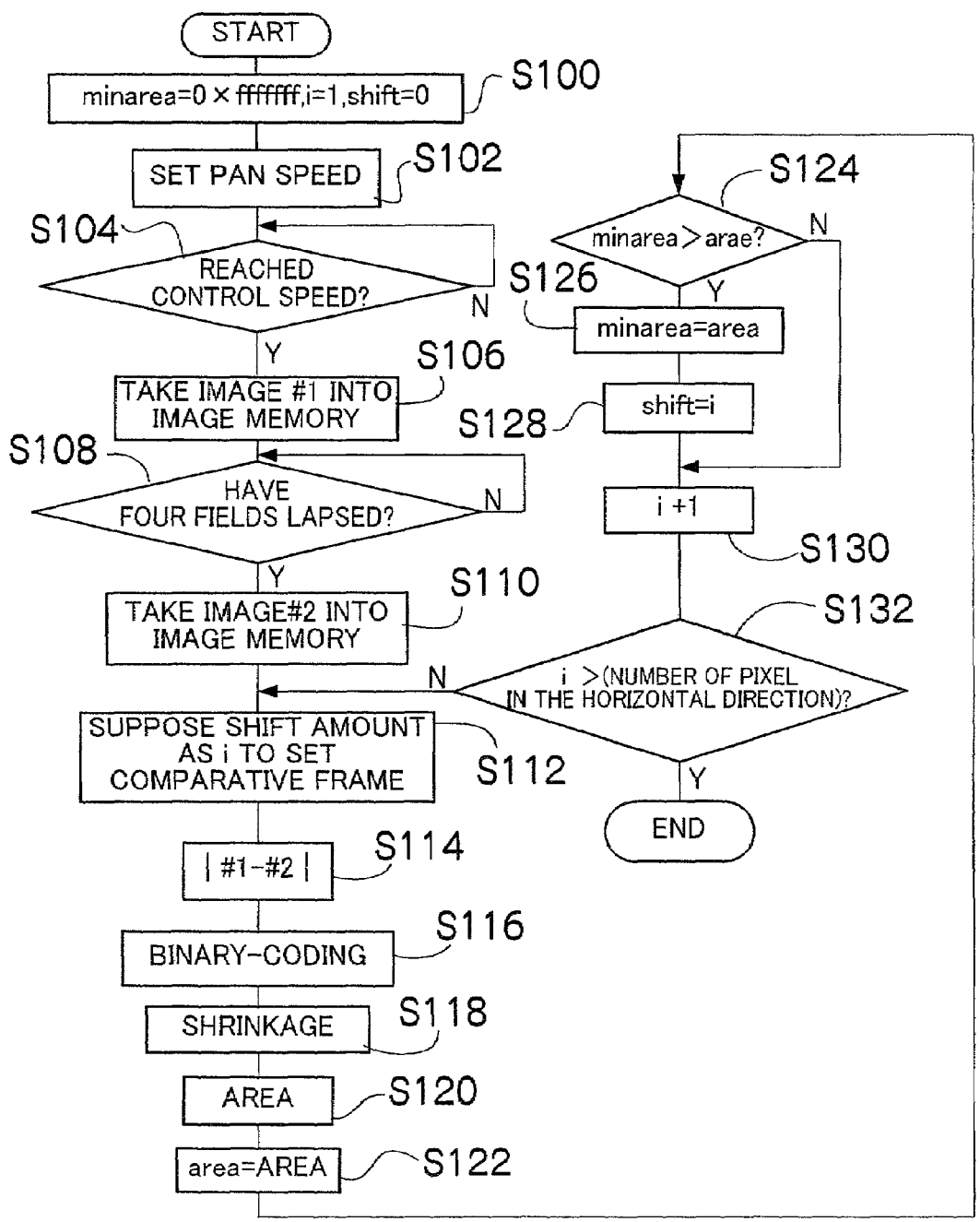

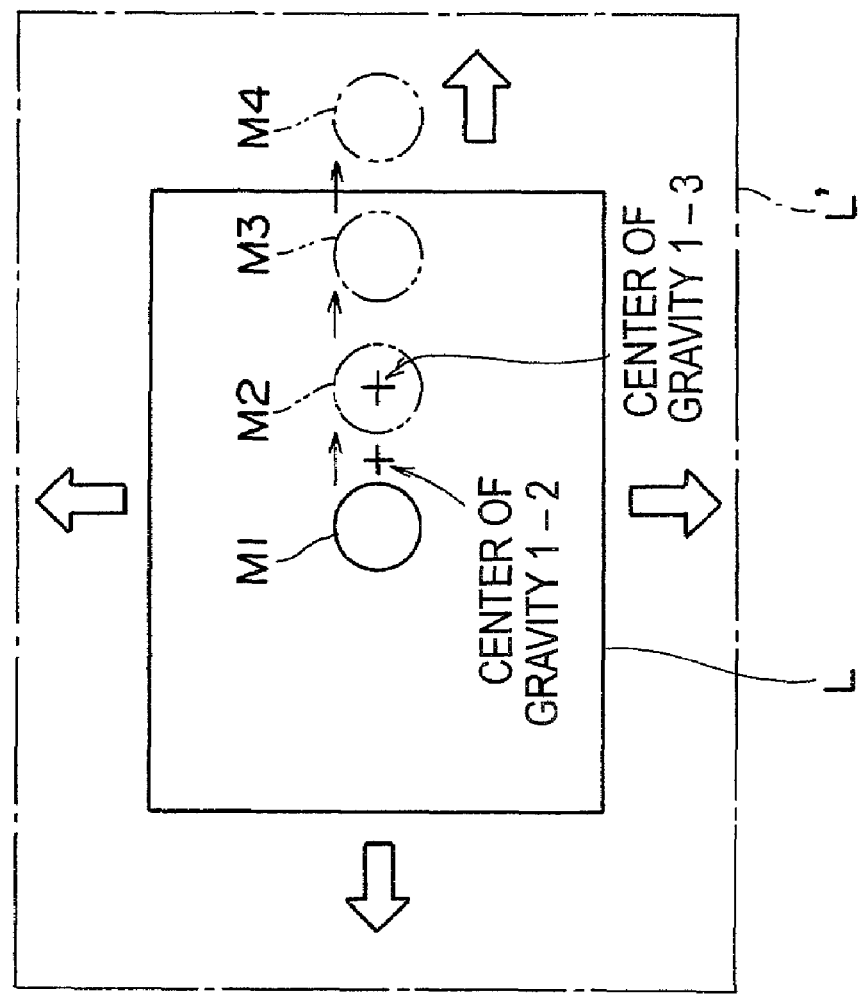

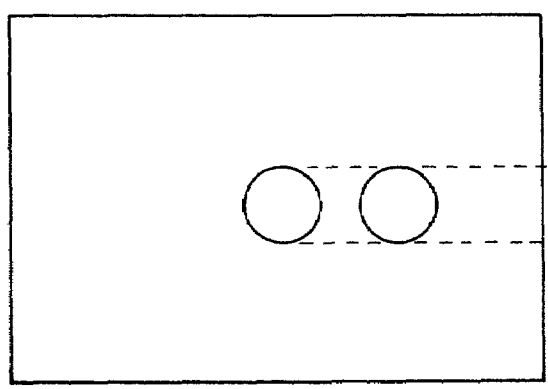
F I G. 1 6 (A)
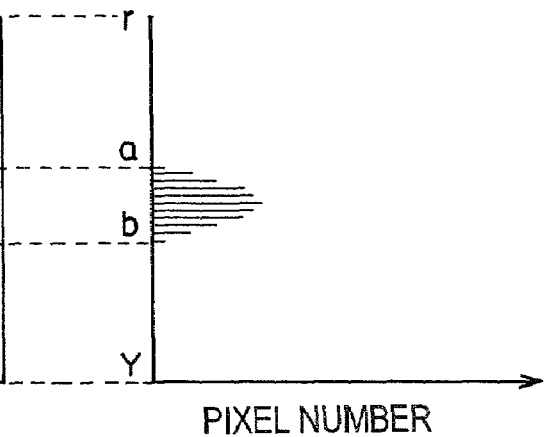
F I G. 1 6(B)
PIXEL NUMBER

F I G. 1 9
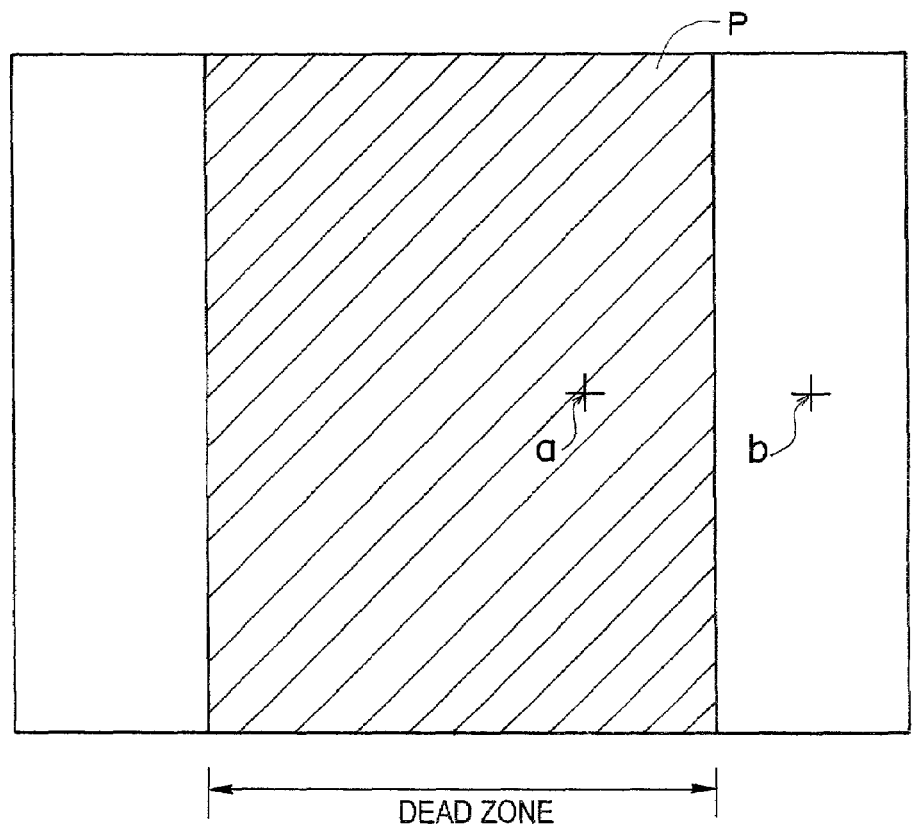
DEAD ZONE
F I G. 2 0
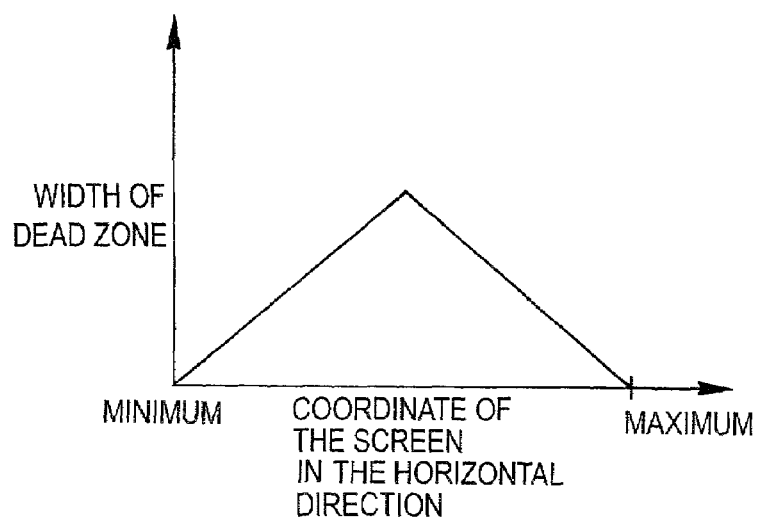

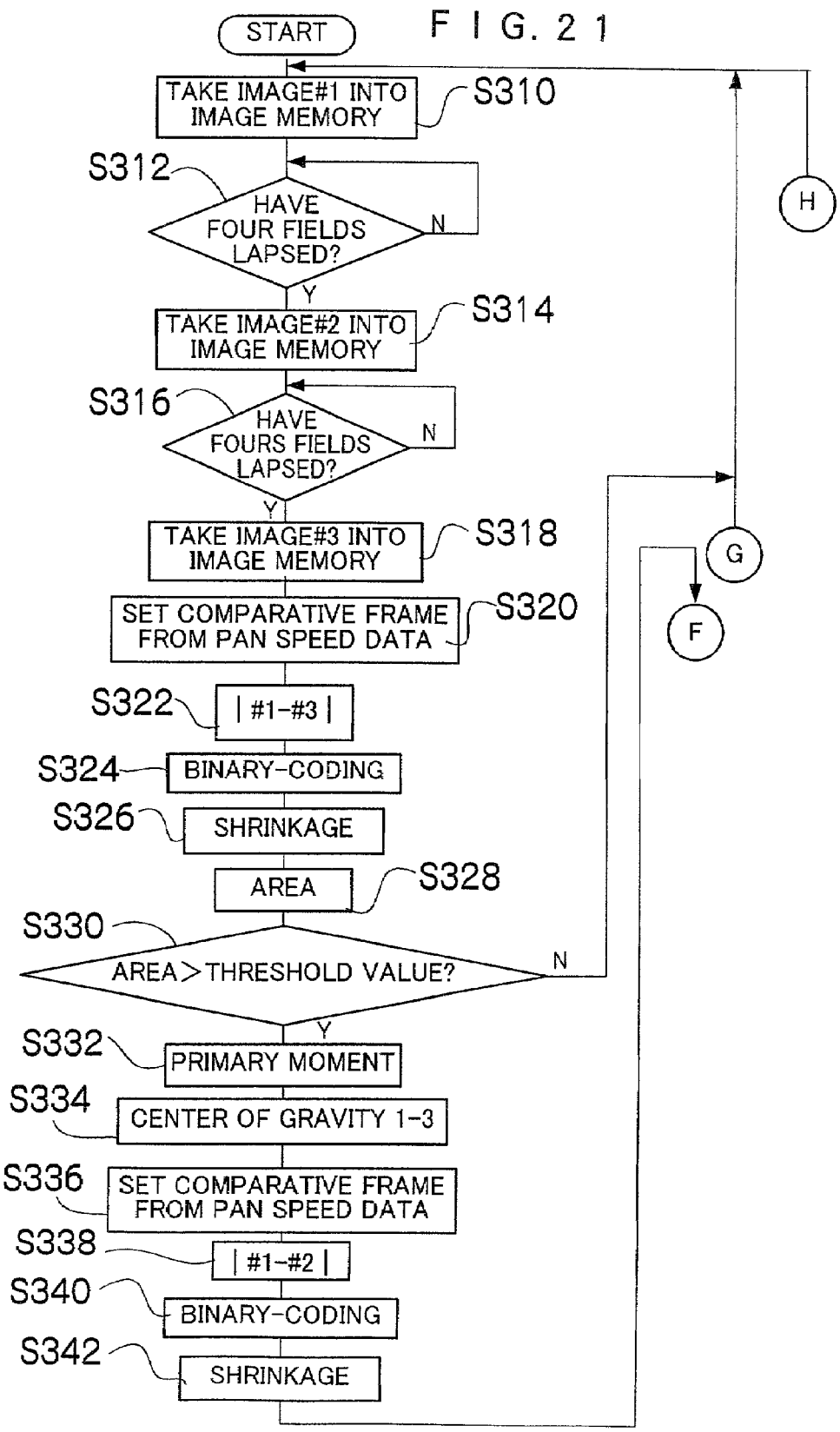

F I G. 2 2 (A)
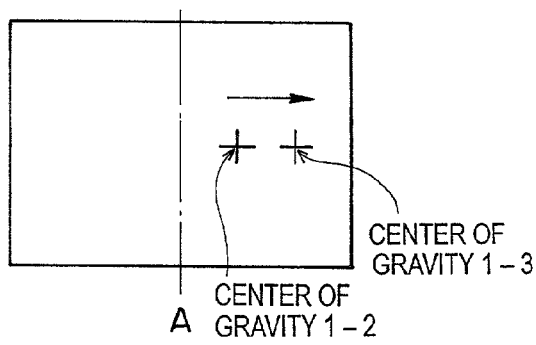
F I G. 2 2 (B)
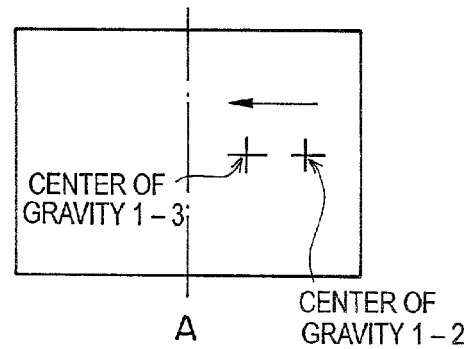
F I G. 2 2 (C)
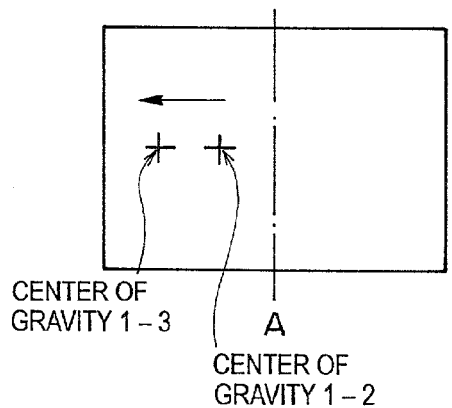
F I G. 2 2 (D)
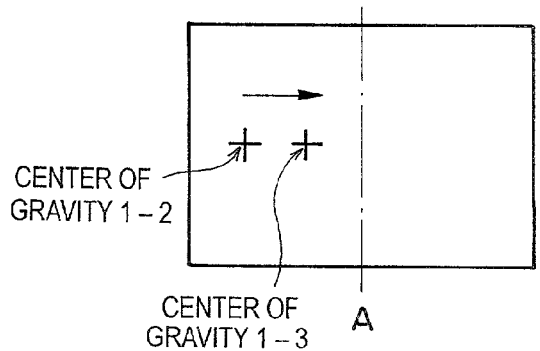

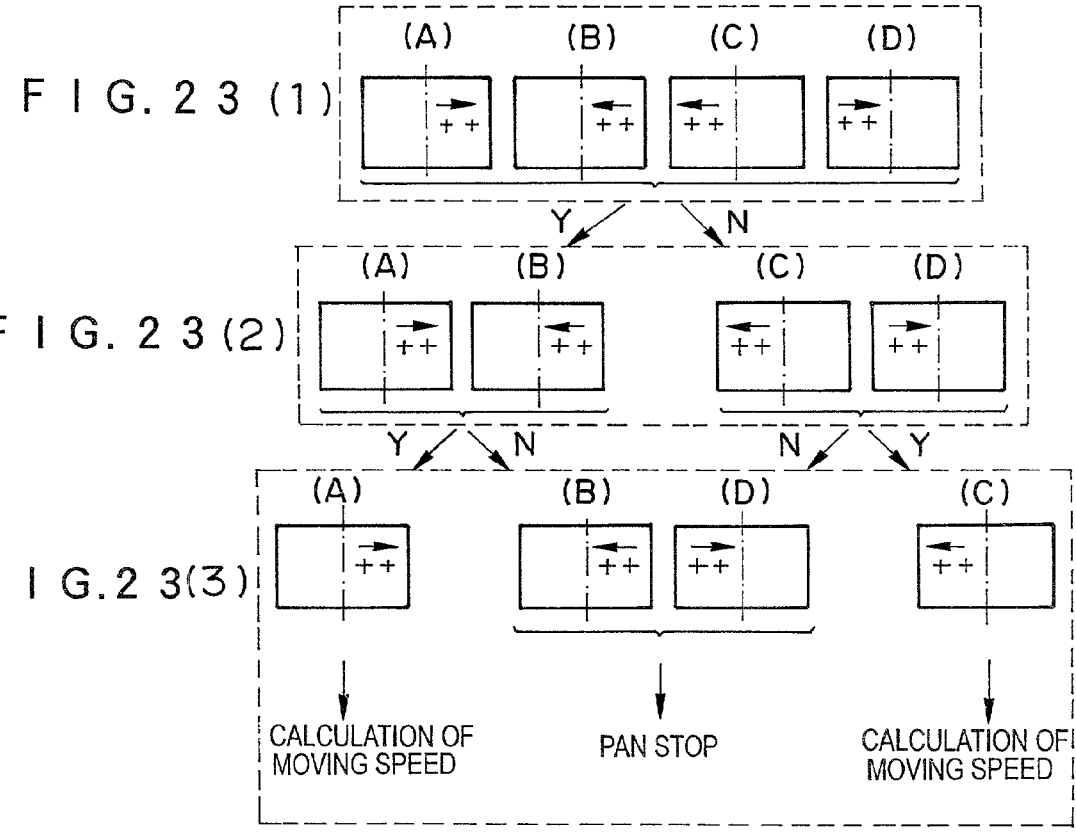

FOLLOWING DEVICE

BACKGROUND OF THE INVENTION

1. Field of the Invention

The present invention relates to a following device, and in particular to a following device which automatically follows a moving object with shooting direction of a camera caused to move automatically.

2. Description of the Related Art

A following device is a device which causes a pan head on which a television camera is mounted to pan/tilt with motor drive so as to automatically move the shooting direction of a camera and automatically follow moving subjects. As a method of following, the one described in Japanese Patent Application Publication No. 59-208983 is widely known. According to this method, an image covering two frames (covering two screens) in a predetermined time span from image signals outputted from a camera, and an image of a moving object is extracted with comparison of those images. In addition, from the position of the center of gravity of that extracted moving object, moving amount as well as moving direction of the moving object is detected, and the shooting direction of the camera is automatically controlled with panning/tilting of the pan head so that the center of gravity of the moving object always stays in the center of the screen based hereon.

In the present specification, operations of the pan head caused to move the shooting direction of the camera in the panning direction or the tilting direction will be referred to as the panning direction or tilting direction of the pan head or merely the movement of the pan head.

In the method of following described in the above described Japanese Patent Application Publication No. 59-208983, in order to extract images of a moving object by comparing images covering two frames taken in from a camera, the pan head is required to halt while those images for comparison are being taken in. That is, difference in shooting ranges of images for comparison due to movement of the pan head gives rise to movement of the image of the static objects on the screen so as to make it impossible to distinguish the image of the moving object and therefore the pan head cannot be moved while the images for comparison are being taken in. Thus, the above described following method cannot follow moving objects which move fast, and the pan head repeats movement and halt, giving rise to such defaults that the screen becomes less vision-friendly.

Under the circumstances, in order to overcome such a defect, the present applicant of the present application has proposed in Japanese Patent Application Publication No. 2000-175101 a method of following which has made it possible to extract the image of the moving object also from images of different shooting ranges and to recognize the images of the moving objects in spite that the pan head is being moved. According hereto, in spite that the pan head is halted or is moving, the images are taken in from the camera and the pan/tilt position of the pan head at that time is acquired. When images covering two frames are taken in a predetermined time, based on the pan/tilt position when each image is taken in, the shooting range of the camera at the time when each image was shot is given and the overlapping range in the shooting range of each image is determined as the comparison range. Within this comparison range, since the image of a static object does not move, comparison of images in the comparisons range will enable extraction of images only of the moving object.

However, the method of following in Japanese Patent Application Publication No. 2000-175101 detects the position of the moving object on the screen so as to control panning/tilting of the pan head so that its position will come approximately to the center of the screen, and thus the pan head will move following the movement of the moving object. Accordingly, when the moving velocity of the moving object gets fast, under such control of the pan head, the moving object would get out of the shooting range of the camera, and might result in failure to follow. In addition, since the moving velocity of the moving object cannot be determine, smooth following is unattainable.

In addition, in the method of following described in the above described Japanese Patent Application Publication No. 59-208983, a slight movement of the moving object within the shooting range of the camera results in a movement of the pan head and a movement of the shooting direction of the camera. Thus, due to defects such as swings of the screen and poor visualization of a camera, the applicant of the present application has provided a range of dead zone in the central portion of the screen in U.S. patent application Ser. No. 09/726,496 and has proposed such a method of following that is caused not to move the pan head in the case where a moving object is moving within the range of that dead zone.

However, the method of following of U.S. patent application Ser. No. 09/726,496 also has problems to be improved. For example, the moving velocity of a moving object could be naturally fast and could be slow, and in the case where the moving velocity is slow, no such events that movement of the pan head gets out of the screen will take place when the moving object gets out of the range of dead zone but in the case where the moving velocity is fast, the moving object gets out of the screen and following could become no longer executable.

Moreover, for example, when the moving object comes inside the screen from outside the shooting range (screen) of the camera, the moving object moves toward the center of the screen (the center of the horizontal direction or the perpendicular direction of the screen) and when a static object inside the screen starts moving, that moving object could move toward the center of the screen. In such a case, essentially, in spite of unnecessity of moving the pan head, in the conventional method of following, following is controlled without discriminating such movement circumstances of a moving object from other moving circumstances, and therefore the pan head will start moving immediately after the movement of the moving object is detected and useless operation of following is executed, giving rise to a problem that the images of the camera will become less visible.

SUMMARY OF THE INVENTION

The present invention has been developed in view of the above-described circumstances, and has as its object the provision of an improved following device which can follow a moving object without fail and smoothly.

In addition, the present invention has as its another object the provision of an improved following device which executes the operation of following suitably corresponding with the moving velocity of the moving object and can follow the moving object with further vision-friendly images.

In addition, the present invention has as its still another object the provision of an improved following device which does not execute following to cover the uniform controlling contents regardless of the moving circumstances of the moving object but execute an appropriate control of following corresponding the moving circumstances of the moving object, in particular, for the circumstances that the moving object is moving toward the center of the screen and for the unlike circumstances so that the images of the camera will become vision-friendly.

In order to achieve the above-described object, the present invention is directed to a following device with a pan head on which a camera is mounted moving to move shooting directions of the above described camera while taking in images shot by the above described camera one after another so as to extract images of a moving object by comparing the taken-in images and to control moving velocity of the above described pan head based on positions on the screen of images of the above described moving objects so as not to dispose the above described moving object outside the shooting range of the above described camera, comprising: a moving object image extraction device to extract image of the above described moving object based on images taken in from the above described camera; a moving velocity detection device to detect moving velocity of the above described moving object from positional changes on a screen of images of the above described moving object extracted by the above described moving object image extraction device; and a control device to control moving velocity of the above described pan head based on the moving velocity of the above described moving object obtained by the above described moving velocity detection device so that the above described moving object does not get out of the shooting range.

In addition, preferably, the above described moving object image extraction device comprises: a comparative range determination device to take in images for two screens from the above described camera and, based on the moving velocity of the above described pan head, to determine as the comparative range a range where the shooting ranges of the above described camera when the above described respective images for two screens are shot overlap; and an image processing device to extract images inside the comparative range determined from respective images for the above described two screens by the above described comparative range determination device and to extract images of the above described moving object by comparing the above described extract respective images.

In addition, preferably, the above described control device enlarges the shooting range of the above described camera in the case where the above described moving object is determine to get out of the shooting range of the above described camera based on images of the above described moving object extracted by the above described moving object image extraction device.

According to the present invention, the moving velocity of the moving object is detected, and the moving velocity of the pan head is controlled based on that moving velocity, and therefore the following performance of the pan head against movement of the moving object is improved so that the moving object will be able to be definitely followed. In addition, the comparative range for extracting the image of the moving object from the image taken in from the camera is determined based on the moving velocity of the pan head, and thereby inexpensive parts will be able to be used for determination compared with the case where the comparative range is determined based on the position of the pan head as described in Japanese Patent Application Publication No. 2000-175101. That is, the time interval to take in respective images covering two screens can be determined accurately, and that time interval is short, and therefore for example, resolution capability as well as accuracy of velocity detection for detecting that the shooting rage has shifted only by 1 pixel may be low compared with the case of position detection, and use of inexpensive sensors as well as A/D converter and the like will become possible. In addition, the images for two screens are arranged to be taken in while the moving velocity of the pan head is constant so that there will be no necessity that the timing when the image is taken in should be caused to accurately coincide with the timing when the moving velocity is detected and high accuracy on time will not become necessary, either. Moreover, without provision of a position detection sensor in the case where a stepping motor is used for pan/tilt operation, the comparative range will be able to be given from the moving velocity.

In addition, in the case where the moving velocity of the moving object is extremely fast and it is determine to go out of the shooting range of the camera, the shooting range of the camera is enlarged, that is, zoom is moved to the wide side so that the moving object with extremely fast moving velocity will be able to be followed without fail.

In order to achieve the above-described object, the present invention is directed to a following device which moves shooting directions of a camera to follow a moving object, comprising: a moving object image extraction device to extract images of a moving object from images shot by a camera; a velocity determination device to judge whether the moving velocity of a moving object is lower velocity or higher velocity than the above described velocity based on images of the moving object extracted by the above described moving object image extraction device; a range determination device to judge whether or not images of the above described moving object are inside the range of a predetermined dead zone set on a shooting screen of the above described camera in the case where the moving velocity of the above described moving object is determine to be the above described low velocity by the above described velocity determination device; and a shooting direction control device to move shooting directions of the above described camera so as not to cause the above described moving object to get out of the shooting range of the above described camera based on images of the moving object extracted by the above described moving object image extraction device in the case where the moving velocity of the above described moving object is determine to be the above described high velocity by the above described velocity determination device or the image of the above described moving object is determine to be outside the range of the above described dead zone by the above described range determination device, and to halt movements in the shooting direction of the above described camera in the case where the moving velocity of the above described moving object is determine to be the above described low velocity by the above described velocity determination device and the image of the above described moving object is determine to be within the range of the above described dead zone by the above described range determination device.

According to the present invention, only in the case where the moving velocity of the moving object is slow, the shooting direction of the camera is controlled in consideration of the dead zone set on the shooting screen, and thus in the case where the moving velocity of the moving object is fast, inconvenience due to control of the shooting direction of the camera in consideration of the dead zone can be prevented, and the moving object can be followed appropriately with vision-friendly images.

In order to achieve the above-described object, the present invention is directed to a following device which moves shooting directions of a camera to follow a moving object, wherein shooting directions of the above described camera are not moved in the case where the moving object is moving toward the center of the screen on the shooting screen of the above described camera, and shooting directions of the above described camera are moved so that the above described moving object does not get out of the shooting screen in the case where the moving object is moving from the center of the screen to outside the screen.

According to the present invention, in the case where the moving object is moving toward the center of the screen, the shooting direction of the camera was arranged not to move, and therefore, for example, when the moving object comes in from outside the shooting range of the camera to inside the shooting range, the shooting direction of the camera will follow the moving object and move after the moving object goes beyond the center of the screen, and thus without giving rise to inconvenience that the shooting direction of the camera moves uselessly, the image of the camera will become vision-friendly.

According to the present invention, the following device operates well.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 10 is an explanatory view of appearance of the comparative frame (comparative range) in the case where the shooting range is shifted leftward;

FIGS. 11(A) to 11(C) are explanatory views of relationship between the subject and the shooting range respectively of the image #1, the image #2 and the image #3 when the pan head 10 is moving rightward;

FIG. 12 is a view of an image of appearance when a moving object is extracted in FIGS. 11(A) to 11(C);

FIG. 13 is an explanatory view used for description in the case where the shift amount of the shooting range toward the control voltage (focal distance) of the pan speed and zooming of the pan head is stored in the memory in advance;

FIG. 14 is a flow chart showing the processing procedure in the case where the shift amount of the shooting range toward the control voltage (focal distance) of the pan speed and zooming of the pan head is stored in the memory in advance;

FIG. 15 is an explanatory view used for description in the case where the shooting range is arranged to expand when the moving speed of the moving object is fast;

FIGS. 16(A) and 16(B) are explanatory views used for description in the case where the shooting range is de-magnified;

FIG. 19 is an explanatory view used for description of a dead zone;

FIG. 20 is an explanatory view used for description of a dead zone;

FIGS. 22(A) to 22(D) are explanatory views of relationship between the position of the center of gravity of the moving object on the screen and the center of the screen; and FIGS. 23(1) to 23(3) are explanatory views used for description of processing of FIG. 21.

DETAILED DESCRIPTION OF THE PREFERRED EMBODIMENTS

Hereunder a preferred embodiment will be described in detail for a structure of a following device according to preferred embodiments of the present invention in accordance with the accompanied drawings.

It should be understood, however, that there is no intention to limit the invention to the specific forms disclosed, but on the contrary, the invention is to cover all modifications, alternate constructions and equivalents falling within the spirit and scope of the invention as expressed in the appended claims.

Figure 1:
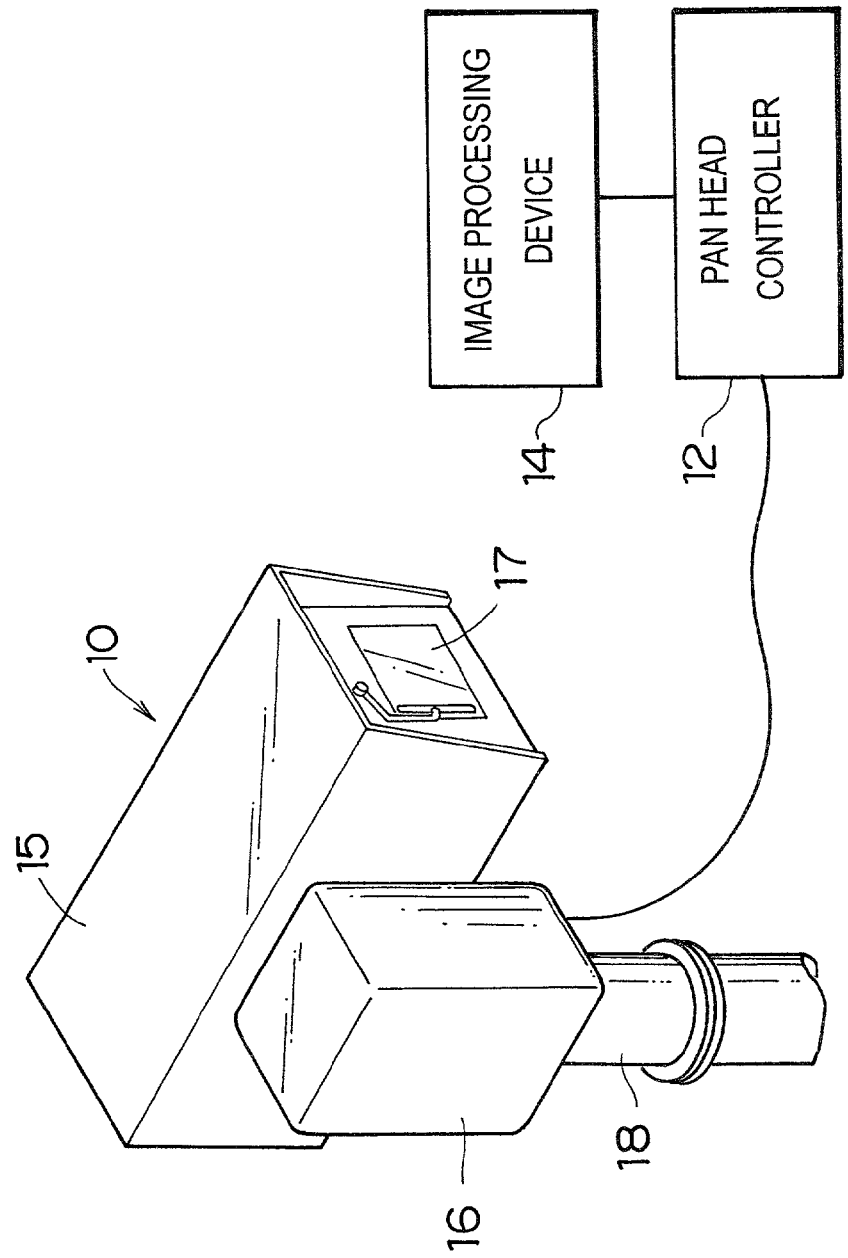
FIG. 1 is a schematic constitutional view of a remote control pan head system on which following function is mounted to which the present invention is applied.

FIG. 1 is a schematic constitutional view of a remote control pan head system on which following function is mounted to which the present invention is applied. A remote control pan head system shown in the above described drawing comprises a remote control pan head 10 (hereinafter merely referred to as pan head 10), a pan head controller 12 and an image processing device 14. The pan head 10 comprises a housing 15 to house a television camera (to be referred to merely as a camera as follows), a pan head main body 16 to pan as well as tilt the camera inside the housing 15 by rotating the housing 15 in its entirety. The front face of the housing 15 is provided with a transparent protection glass 17, and the camera housed inside the housing 15 shoots images outside the housing 15 via this protection glass 17.

The above described housing 15 is supported by a tilt axis (not shown) extended from the pan head main body 16, and this tilt axis is rotated by a tilt motor built-in in the pan head main body 16. Accordingly, when the tilt motor is operated, the housing 15 is rotated via the tilt axis so that the camera inside the housing 15 is titled. In addition, the pan head main body 16 is supported by a pan axis 18 fixed on a not shown disposition stand, the pan head main body 16 is rotated by a built-in pan motor with this pan axis 18 as the axis. Accordingly, when the pan motor is operated, the pan head main body 16 as well as the housing 15 is rotated so that the camera inside the housing 15 is panned.

The above described pan head controller 12 is connected with the pan head 10 via a cable (connection via an exclusive line and a communication line such as a public line etc. are feasible) and control signals are transmitted to the pan head 10 based on operations of respective kinds of operating members provided in the pan head controller 12 so that respective kinds of operations of the pan head 10 as well as the camera mounted on the pan head 10 are controlled. In addition, the pan head controller 12 transmits the control signals to the pan head 10 based on the signals given from the image processing device 14 so as to move (pan/tilt) the pan head 10 to cause the camera to follow the moving subject.

Figure 2:
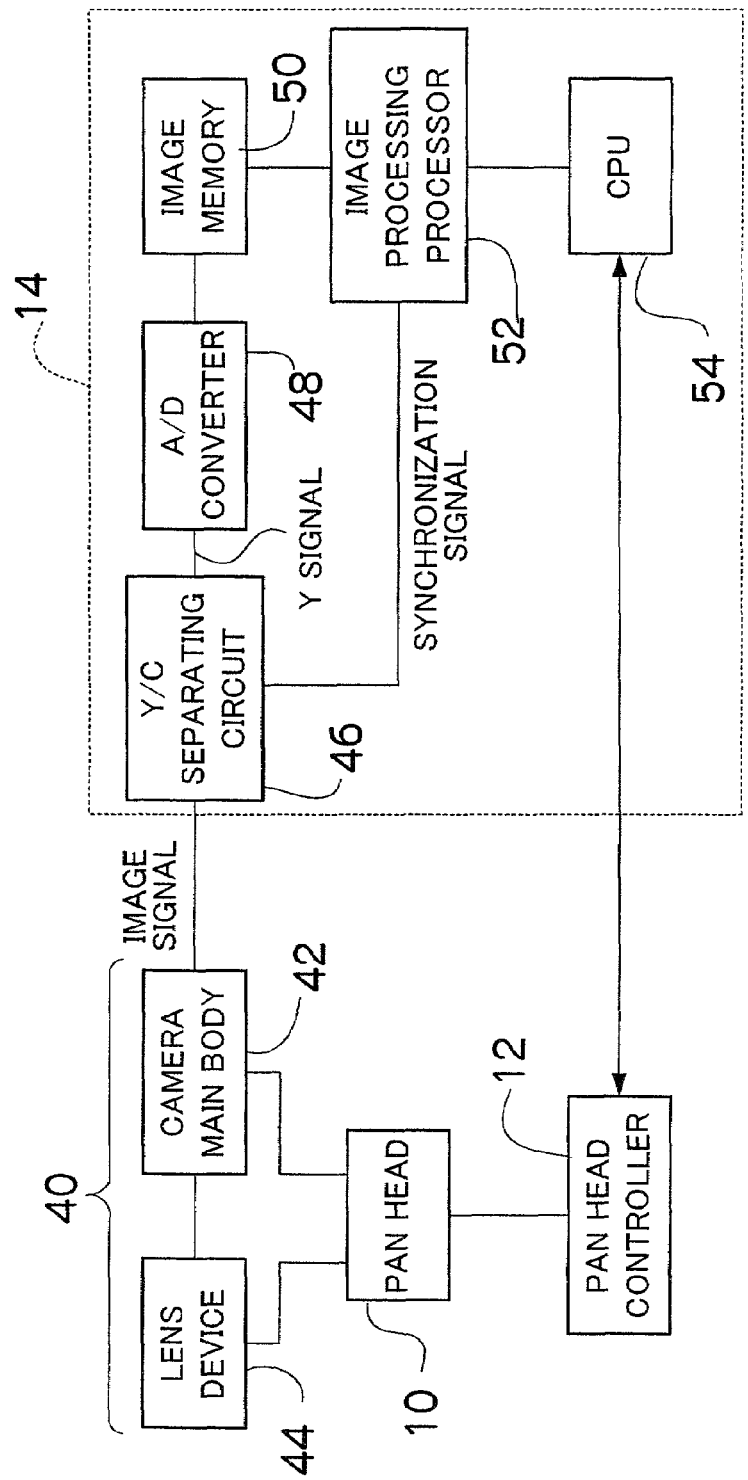
FIG. 2 is a block diagram showing the construction of a remote control pan head system.

FIG. 2 is a block diagram showing the construction of the above described remote control pan head system. As shown in the above described drawing, the camera 40 housed in the housing 15 of the pan head 10 comprises a camera main body 42 and a lens device 44 attached to the camera main body 42. The imaging element as well as required processing circuit is included in the camera main body 42 and an image (moving picture) focused into the imaging element via the optical system of the lens device 44 is outputted outward as image signals (image signals of NTSC system in the present embodiment). Shooting operations such as commencement as well as conclusion of shooting etc. in the camera main body 42 are controlled based on the control signals given from the pan head controller 12 via the pan head 10. In addition, optical members such as a focus lens or zoom lens etc. that can be operated by a motor are mounted on the lens device 44, and movements of these focus lens or zoom lens adjust focus or zooming of the camera 40. Operations of the lens device 44 such as focusing or zooming are controlled based on the control signals given from the pan head controller 12 as in the camera main body 42.

The pan motor and the tilt motor as described above are mounted onto the pan head 10 and when the control signals given from the pan head controller 12 operate these pan motor and tilt motor, the camera 40 is panned or tilted so that the shooting direction of the camera 40 moves. The operations of the pan head 10 when the camera 40 is panned or tilted will be referred to as "the pan head 10 moves" in the present specification.

As shown in the above described drawing, the image processing device 14 comprises various kinds of signal processing circuits such as Y/C separating circuit 46, an image memory 50, an image processing processor 52, and a CPU 54, and these signal processing circuits operate effectively when the pan head controller 12 is under the following mode. The image signal outputted from the camera main body 42 is inputted to this image processing device 14, and at the time of following mode, that image signal is separated into luminance signals (Y signal) and color difference signals with the camera main body Y/C separating circuit 46. Here, the separated luminance signal is converted into a digital signal (hereinafter referred to as image data) with an A/D converter 48 and inputted into the image memory 50. On the other hand, a synchronization signal of the image signal is given to the image processing processor 52 from the Y/C separating circuit 46 so that a command of data write-in is given to the image memory 50 from the image processing processor 52 at a required timing based on this synchronization signal. This causes the image memory 50 to store the image data covering a plurality of frames in a predetermined time interval as described later. Since the image signal of the NTSC system adopts an interlace system, the image for one frame is constituted with an image for two fields, but the wording "image data of one frame" in the present specification means the image data constituting one screen among a series of images shot in a consecutive fashion, and in the present embodiment, the image data of one frame shall refer to the image data for one field.

As described above, the image data for a plurality of frames stored in the image memory 50 are as described below read out to the image processing processor 52 and undergo image processing, and also undergo calculation processing with the CPU 54 based on the results of that image processing, and the moving speed in the panning direction as well as in the tilting direction (the pan speed as well as the tilt speed) of the pan head 10 in order to follow the moving object with the camera 40 is calculated. The CPU 54 is provided with the focal distance (picture angle) of the lens device 44 at each time point as well as the moving speed of the pan head 10 (the pan speed as well as the tilt speed) from the pan head controller 12 for calculation of the moving speed (for calculation of the below described comparative frame).

In the case where the pan head controller 12 is set to the following mode, the above described pan head controller 12 is provided with the moving speed calculated by the CPU 54 of the image processing device 14 as the command signal so that a control signal is transmitted from the pan head controller 12 to the pan head 10 to realize that moving speed. On the other hand, in the case where the pan head controller 12 is not set to the following mode, a control signal is transmitted from the pan head controller 12 to the pan head 10 based on the operation of the respective operation member provided in the pan head controller 12 as described above SO that the respective operations of the pan head 10 as well as the camera 40 mounted on the pan head 10 are controlled.

Processing contents of the above described image processing processor 52 as well as the CPU 54 of the image processing device 14 in case of setting to the following mode in the remote control pan head system constituted as described above will be described based on the flow chart in FIG. 3. For the flow chart in FIG. 3 as well as description hereunder, mainly processing related to movement in the panning direction of the pan head 10 will be shown, but also for movement in the tilting direction the likewise processing as in the panning direction shall be made.

At first, the image processing processor 52 takes the image data (this image is regarded as image #1) for one frame obtained from the camera main body 42 of the camera 40 via the Y/C separating circuit 46 and the A/D converter 48 into the image memory 50 (Step S10).

Subsequently, the image processing processor 52 judges whether or not time for 4 fields ($1/59.94$ seconds per field) has lapsed with the synchronization signal given by the Y/C separating circuit 46 (Step S12), and when the time for 4 fields has lapsed, takes into the image memory 50 the image data (this image is regarded as the image #2) for one frame as in case of the image #1 (Step S14).

Moreover, the image processing processor 52 judges whether or not time for 4 fields ($1/59.94$ seconds per field) has lapsed with the synchronization signal given by the Y/C separating circuit 46 (Step S16), and when the time for 4 fields has lapsed, takes into the image memory 50 the image data (this image is regarded as image #3) for one frame as in case of the image #1 and the image #2 (Step S18).

As described above, when image data for three frames are stored in the image memory 50, the CPU 54 acquires the focal distance (picture angle) of the present camera 40 (lens device 44) as well as the moving speed of the pan head 10 from the pan head controller 12, and based hereon the comparative range (comparative frame) of the image #1 and the image #3 are set and the comparative frame thereof is designated to the image processing processor 52 (Step S20). The data on the moving speed used for setting of the comparative frame may not be acquired from the pan head controller 12 but may be data on the moving speed that the CPU 54 commanded to the pan head controller 12 as described above.

Here, the comparative frame will be described. As described below, the image processing processor 52 compares the image #1 with the image #3 so as to give the difference of values of respective pixels (hereinafter "pixel values") of these image data for making difference images. The difference images are made in order that the image of the moving object to become the subject to be followed is extracted from the two images #1 and #3, and for extraction of the image of the moving object with this difference image, it is necessary to obtain the difference image from the images within the same shooting range (the range where the shooting ranges are overlapped) in the shooting range of the image #1 and the shooting range of the image #3.

For example, when the pan head 10 stays still as in case of immediately after commencement of following processing, the shooting ranges of the image #1 and the image #3 are same. FIG. 4(A) shows the relationship between the subject and the shooting range in this case, and the shooting range L of the image #1 completely corresponds with the shooting range L' of the image #3. In the drawing, the object indicated by a circle is a moving object while the objects indicated by triangles are static objects. In addition, the moving object is located in the position indicated by A shown in the drawing at the time of shooting of the image #1 while shall move to the position indicated by B in the drawing at the time of shooting of the image #3.

At this time, the image #1 as well as the image #3 stored in the image memory 50 constitute a screen as shown in FIG. 4(B) and FIG. 4(C), and in the screens respectively of these image #1 and the image #3, the image of the static objects indicated by the triangles will exist on the same coordinate, but only the image of the moving object indicated by the circle will exist on the different coordinate.

Figure 5:
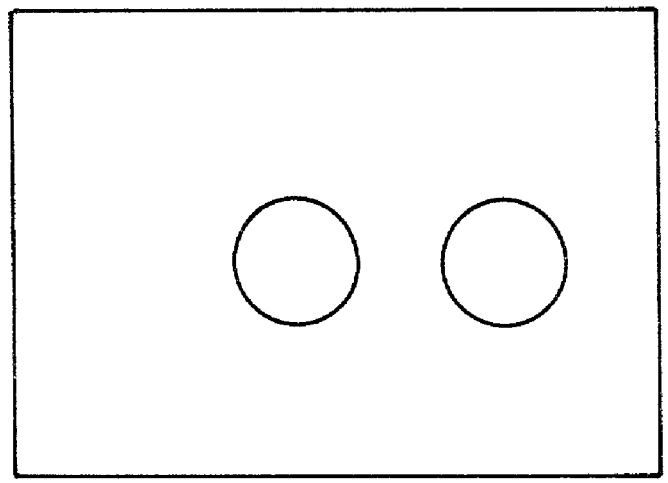
FIG. 5 is an explanatory view of an example of a difference image in case of FIGS. 4(A) to 4(C)
Figure 6:
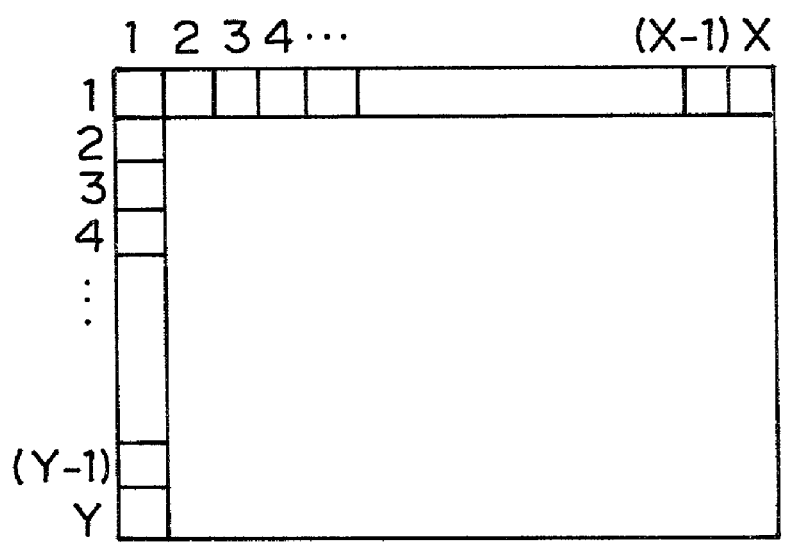
FIG. 6 is an explanatory view that is used to describe coordinates on the screen.

Accordingly, if the difference of the pixel values between pixels in the corresponding positions (the same coordinate) is obtained for the entire screen range (inside the entire shooting range) of the image #1 and the image #3, the pixel value of the static objects will become 0 in that difference image and the difference image with extraction only of the moving object is obtained as shown in FIG. 5. Coordinates of respective points on the screens of the respective images are subject to arrangement of pixels shaping a matrix constructing one screen, and, as shown in FIG. 6, are expressed by column number of each point in the horizontal direction (1 to X allocated in order from the pixel in the left end of the screen (X corresponds with the pixel numbers indicating horizontal resolution)) and are expressed by line number of each point in the perpendicular direction (1 to Y allocated in order from the pixel in the upper end of the screen (Y corresponds with the pixel numbers indicating perpendicular resolution)).

On the other hand, in such a case that the pan head 10 is moved, the shooting ranges at respective shooting time of the image #1 and the image #3, the shooting ranges are different. FIG. 7(A) depicts the relationship between the subject and the shooting range in this case, and the shooting range L of the image #1 is different from the shooting range L' of the image #3. The subjects (the moving object and the static objects) in the drawing are put under the same conditions as in FIG. 4(A). At this time, the image #1 and the image #3 stored in the image memory 50 respectively constitute the screens as shown in FIGS. 7(B) and 7(C), and thus the image of the static objects indicated by the triangles will not exist on the same coordinate on the respective screens of these image #1 and image #3. Accordingly, when the difference image is obtained over the entire these screen ranges as described above, such a difference image as if the static objects were a moving object will be given, and moving object only cannot be extracted appropriately.

Figure 8:
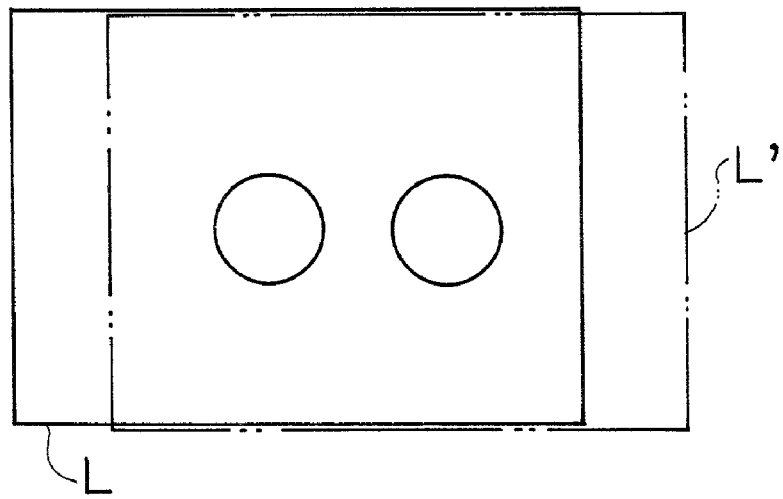
FIG. 8 is an explanatory view of an example of a difference image in case of FIGS. 7(A) to 7(C)

Under the circumstances, the images from the entire screen range of the image #1 and the entire screen range of the image #3, the range where the shooting ranges overlap, that is, from the range where the shooting range L of the image #1 overlaps the shooting range L' of the image #3 are respectively extracted from the image #1 and the image #3 so that difference in pixel values of the corresponding position between the images within that extracted range is given and thus the difference image will be given. Thereby, in that difference image the pixel value of the static objects will become 0 so that the difference image will be given subject to extraction of the moving object only as shown in FIG. 8.

Figure 4:
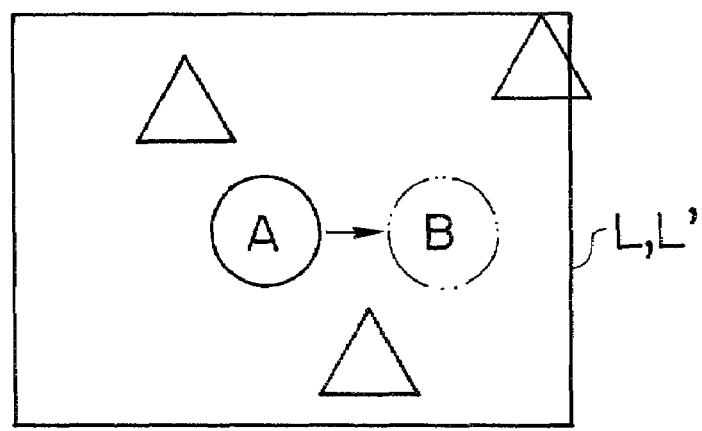
FIGS. 4(A) to 4(C) are explanatory views of relationship between the subject and the shooting range when the pan head stays still.
Figure 4:
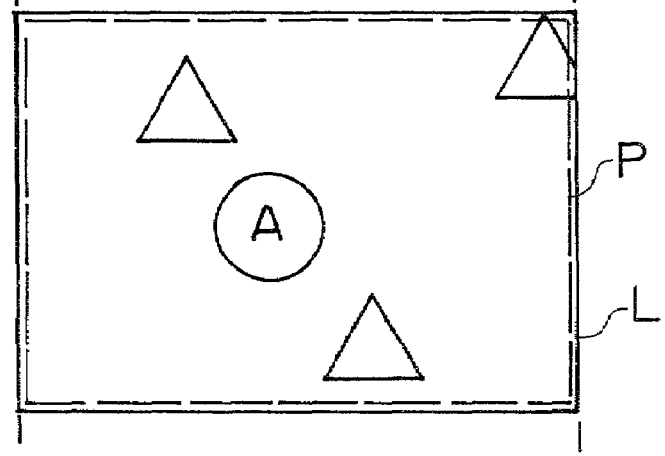
Figure 4:
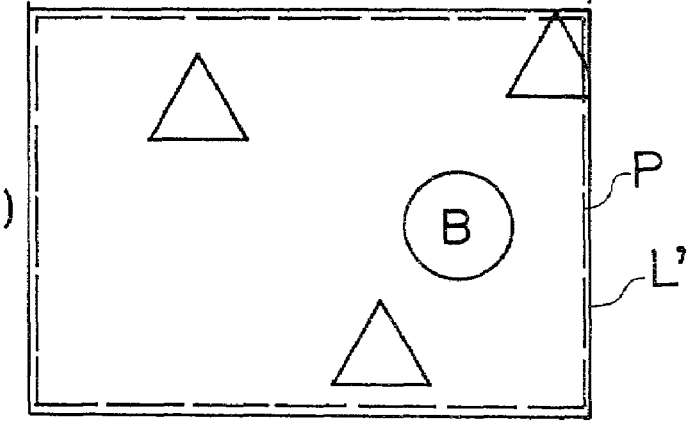
Figure 7:
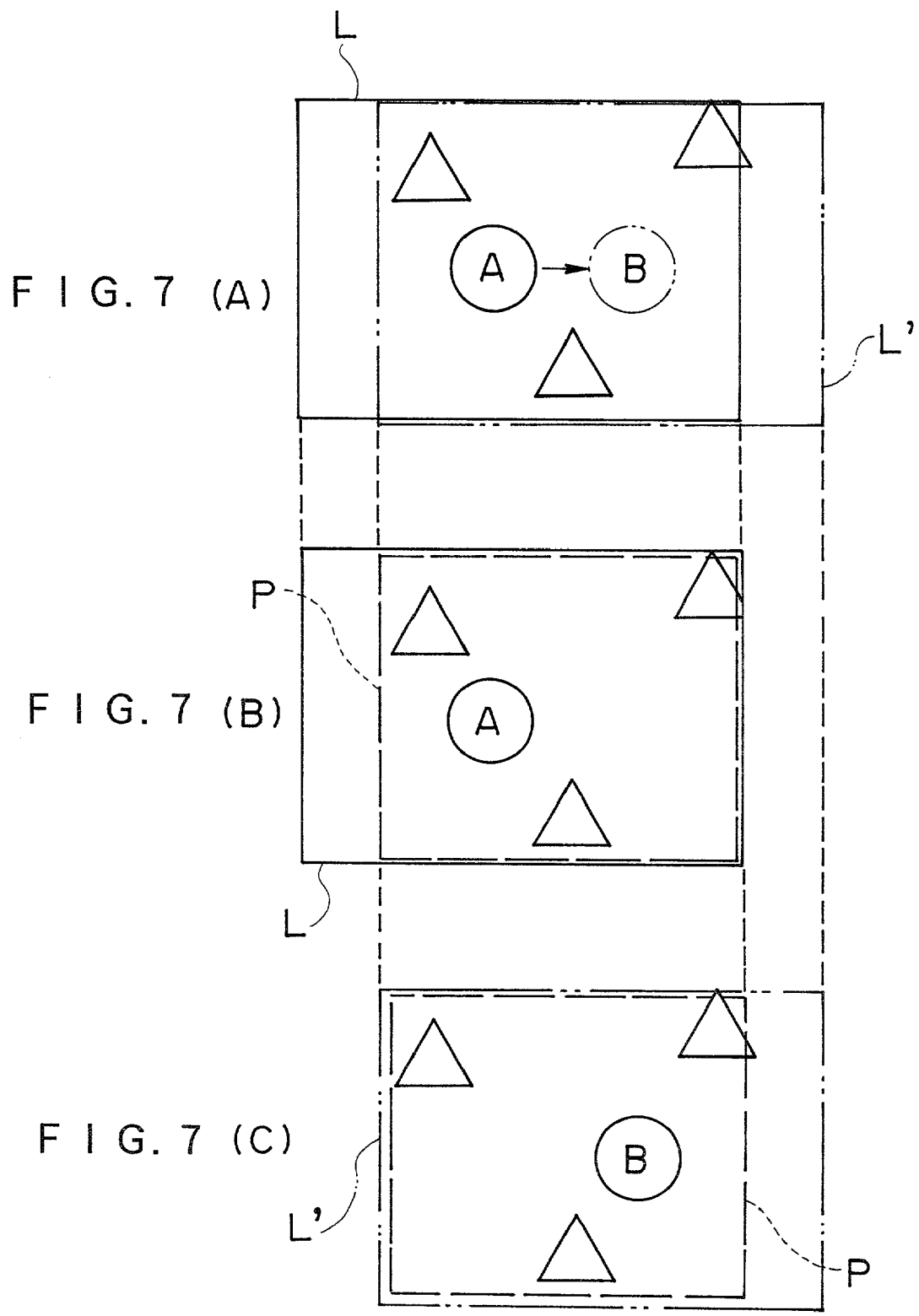
FIGS. 7(A) to 7(C) are explanatory views of relationship between the subject and the shooting range when the pan head is moving.

In order to obtain the difference image subject to extraction of the moving object from the image #1 and the image #3, it is necessary to set a comparative range to give that difference image in the respective screens of the image #1 and the image #3, and the one expressed by a frame for that comparative range is the comparative frame. And, the comparative frame is set as a frame of the shooting range where the shooting range L of the image #1 overlaps the shooting range L' of the image #3. As in FIG. 4, in the case where the pan head 10 stays still, the shooting range L of the image #1 completely corresponds with the shooting range L' of the image #3, and therefore, as shown in FIGS. 4(B) and 4(C), the comparative frame P is set as a frame over the entire screen range on the respective screens of the image #1 and the image #3. On the other hand, in the case where the pan head 10 is moving as in FIG. 7, the shooting range L of the image #1 is different from the shooting range L' of the image #3, and therefore, as shown in FIGS. 7(B) and 7(C), the comparative frame P is set as a frame of a range where the shooting range L of the image #1 overlaps the shooting range L' of the image #3 on the respective screens of the image #1 and the image #3.

For description of a concrete processing contents of the setting of the comparative frame, when the image #1 and the image #3 are taken into the image memory 50 as described above, the CPU 54 acquires the present focal distance of the lens device 44 and the present moving speed (pan speed) of the pan head 10 from the pan head controller 12. In addition, the CPU 54 gets the shooting picture angle (horizontal picture angle showing angular range in the horizontal direction) from the focal distance of the lens device 44 so as to calculate from that shooting picture angle and the moving speed the shooting range of the image #3 covering how many pixels in terms of pixel number have shifted in the horizontal direction against the shooting range of the image #1. That shift amount shift (unit: pixel) is:

$$\text{shift}=(R/A)\times V\times T \tag{1}$$

wherein, V (unit: degree/second) is the moving speed (pan speed) of the pan head 10, R (unit: pixel) is the resolution (horizontal resolution) of the image, A (unit: degree) is the shooting picture angle (horizontal picture angle) and T (unit: second) is the shooting time difference (time interval for taking pictures of the image #1 and the image #3) of the image #3 against the image #1. In calculation of the shift amount shift in the perpendicular direction, the moving speed V is the tilt speed, the resolution R is the perpendicular resolution and the shooting picture angle A is the perpendicular picture angle indicating the angle range in the perpendicular direction. In addition, if the image #1 is taken in after time covering eight fields has lapsed after the image #3 is taken in, the shooting time difference T is a value by octuplicating the time (1/59.94 seconds) covering one field.

However, the image #3 is repeatedly renewed when the moving velocity of the moving object is slow as described below, and therefore the shooting time difference T is not limited to this value.

Figure 9:
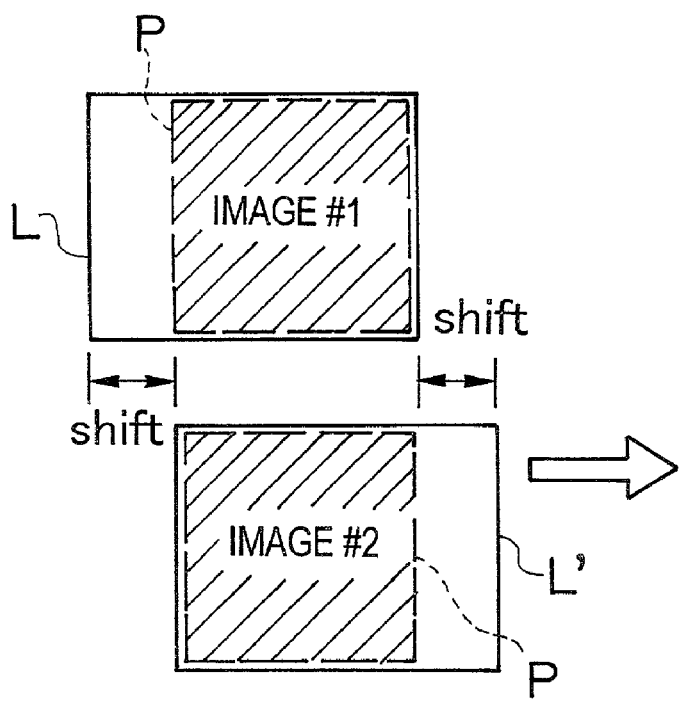
FIG. 9 is an explanatory view of appearance of the comparative frame (comparative range) in the case where the shooting range is shifted rightward.

Calculating the shift amount shift with the above described equation (1), the CPU 54 sets the comparative frame on the screen of the image #1 and the image #3 based on this shift amount shift. That is, as shown in FIG. 9, in the case where the shooting range L' of the image #3 moves rightward (the pan head 10 moves rightward) against the shooting range L of the image #1, the outline of the range (the range indicated with slanted lines in the drawing) excluding the number of pixels covering the shift amount shift from the left end side of the screen in the entire screen range of the image #1 is set as the comparative frame P with respect to the comparative frame of the image #1, and on the other hand, the outline of the range (the range indicated with slanted lines in the drawing) excluding the number of pixels covering the shift amount shift from the right end side of the screen in the entire screen range of the image #3 is set as the comparative frame P with respect to the comparative frame of the image #3. As shown in FIG. 10, in the case where the shooting range L' of the image #3 moves leftward (the pan head 10 moves leftward) against the shooting range L of the image #1, the outline of the range (the range indicated with slanted lines in the drawing) excluding the number of pixels covering the shift amount shift from the right end side of the screen in the entire screen range of the image #1 is set as the comparative frame P with respect to the comparative frame of the image #1, and on the other hand, the outline of the range (the range indicated with slanted lines in the drawing) excluding the number of pixels covering the shift amount shift from the left end side of the screen in the entire screen range of the image #3 is set as the comparative frame P with respect to the comparative frame of the image #3. The case where the pan head 10 moves in the upward and downward directions is likewise.

For description back to the flow chart in FIG. 3, when the comparative frame is set by the CPU 54 as described above, and that comparative frame is indicated to the image processing processor 52, the image processing processor 52 subsequently extracts the image inside the comparative frame respectively from the image #1 and the image #3 so that the difference image of the image #1 and the image #3 is given by that extracted image (Step S22). That is, from the image data inside the comparative frames of the image #1 and the image #3, the difference of the pixel values of the pixels in the corresponding positions (pixels existing in the same position in the comparative frame) is given and that absolute value (|#1−#3|) is given. This causes only images of the moving object to be extracted as in the above described FIG. 5 and FIG. 8, and that moving object is recognized as the subject to be followed.

Subsequently, the image processing processor 52 binary-codes the image data of each pixel of the difference image given by Step S22 (Step S24). This processing will ideally give rise to 1 as the pixel value of the image of the moving object and 0 otherwise. In addition, the binary coded difference image undergoes shrink processing so that small noises are removed (Step S26). The difference image subject to binary coding and shrink processing will be referred to merely as difference image below.

Subsequently, the image processing processor 52 gives the total number of pixels with 1 being the pixel value based on the difference image so as to give the area of the entire image of the moving object (hereinafter referred to merely as the area of the moving object) (Step S28). The examples in FIG. 5 and FIG. 8 give the area of two circles indicating images before and after movement of the moving object. In addition, the obtained area is given to the CPU 54.

The CPU 54 acquires the area of the moving object from the image processing processor 52 so as to judge whether or not that area is larger than a predetermined threshold value (Step S30). Here, the case of NO determination is the case where the moving object so as to become an object for following does not exist, including the case where the moving object having been followed until then halts, the case where motion of the moving object is little or the case where only small objects which are not entitled to become an object for following are moving and the like. At this time, the state goes back to Step S10 so that the processing is repeated again from acquisition of an image.

On the other hand, in case of YES determination in the above described Step S30, that is, in the case where the moving object is detected from the difference image, the image processing processor 52 subsequently gives the primary moment over all the image of the moving object from the difference image (Step S32), and the primary moment is divided by the area of the moving object so that the center of gravity of the moving object is given (Step S34). Here, the center of gravity of the moving object is expressed, for example, with coordinates on the screen of the image #1, and the coordinate of that center of gravity is given to the CPU 54. The center of gravity of the moving object given by the image #1 and the image #3 will be expressed with the center of gravity 1-3 below.

Next, the CPU 54, that has set the comparative range (comparative frame) of the image #1 and the image #3 in the above described Step S20, likewise sets the comparative range (comparative frame) of the image #1 and the image #2 based on the focal distance (picture angle) of the present camera 40 (lens device 44) as well as the moving speed of the pan head 10 and that comparative range is designated to the image processing processor 52 (Step S36). In addition, the image processing processor 52 as well as the CPU 54, that has given the center of gravity of the moving object from the image #1 and the image #3 in the above described Step S22 to Step 34 (with exclusion of S30), likewise gives the center of gravity of the moving object from the image #1 and the image #2 (Step S38 to Step S48). The center of gravity of the moving object given by the image #1 and the image #2 will be expressed with the center of gravity 1-2 below.

Here, FIG. 11 depicts relationship between the subject and the respective shooting ranges of the image #1, the image #2 and the image #3 in the case for example where the pan head 10 moves rightward (in the case where the shooting range is shifted rightward), and the shift amounts shift1 and shift2 of the shooting ranges respectively of the image #2 and the image #3 against the shooting range of the image #1 are respectively calculated with the above described (1). The pan speed of the pan head 10 while the image #1 to the image #3 are taken in is understood to be approximately constant, and therefore the shift amount shift1 will become a half amount of the shift amount shift2. In addition, as described above, comparison (acquisition of difference images) of the image #1 with the image #3 as well as of the image #1 with the image #2 causes the images M1, M2 and M3 of the moving object to be extracted on the screen of the image #1 as shown in FIG. 12. Comparison of the image #1 with the image #3 causes the image M1 and the image M3 to be extracted while comparison of the image #1 with the image #2 causes the image M1 and the image M2 to be extracted. With thus extracted images of the moving object, the center of gravity 1-3 as well as the center of gravity 1-2 of the above described moving object is calculated as a position indicated with '+' in the drawing on the screen of the image #1.

When the center of gravity 1-3 as well as the center of gravity 1-2 is given as described above, the CPU54 gives difference between these the center of gravity 1-3 and the center of gravity 1-2, that is, (the center of gravity 1-3)−(the center of gravity 1-2) (Step S50), and based hereon calculates the moving speed of the moving object (Step S52).

Here, on the screen, the moving object moves distance from the image M1 to the image M3 of the moving object, that is, quadruple distance of (the center of gravity 1-3)−(the center of gravity 1-2), as in FIG. 12 during the elapsed time T (elapsed time covering eight fields=(1/59.94)×8) from the time when the image #1 is taken in (shooting time) to the time when the image #3 is taken in (shooting time), and therefore, with ΔL being (the center of gravity 1-3)−(the center of gravity 1-2), the moving speed v (unit: pixel/second) in the pan direction of the moving object on the screen is given by the following equation (2):

$$V = \Delta L \times 4/T \quad (2).$$

In addition, with R (unit: pixel) being resolution (horizontal resolution) of the image and A (unit: degree) being shooting picture angle (horizontal picture angle), the moving speed V (unit: degree/second) in the pan direction of the moving object in the actual space is given by the following equation (3):

$$V = v \times A/R \quad (3).$$

When the moving speed in the tilt direction of the moving object is calculated, the resolution R is perpendicular resolution and the shooting picture angle A is a perpendicular picture angle indicating angle range in the perpendicular direction.

The CPU 54 calculates the moving speed V of the moving object as described above so as to transmit to the pan head controller 12 a command signal commanding movement in the pan direction of the pan head 10 with that moving speed V (Step S54). This controls the pan speed of the pan head 10 with the pan head controller 12. In addition, the CPU 54 judges whether or not the current moving speed (pan speed) of the pan head 10 given by the pan head controller 12 has reached the pan speed commanded by the above described CPU 54 (Step S56), and in case of YES determination, the state goes back to the above described step S10 so that the above described processing is repeated.

So far in the above described processing, when the moving speed of the moving object is detected, the image #1 to the image #3 covering three frames were taken in so that comparison of the image #1 with the image #3 as well as of the image #1 with the image #2 would give two centers of gravity namely the center of gravity 1-3 and the center of gravity 1-2, but without limitation hereto, comparison of the image #1 with the image #2 as well as of the image #2 with the image #3 may give two centers of gravity so that the moving speed of the moving object is detected, and comparison of the image #1 to the image #4 covering four frames may be taken in so that comparison on two not-overlapped groups of images covering two frames each, for example, comparison of the image #1 with the image #2 as well as of the image #3 with the image #4 gives two centers of gravity to detect the moving speed of the moving object.

Next, a method of determining the shift amount shift in the setting of the comparative frame in the above described Step S20 as well as Step S36 (shift amount of the shooting range of the image #2 or the image #3 against the shooting range of the image #1) will be described in a concrete fashion. Only movement in the pan direction of the pan head 10 being taken into consideration also for description as follows, the case where the shift amount in the horizontal direction will be described.

As indicated in the above described equation (1), the shift amount shift can be given based on the pan speed of the pan head 10 and the picture angle (focal distance), and the values of those pan speed and the picture angle can be determined by the CPU 54 acquiring a predetermined data from the pan head controller 12. For example, with acquisition, from the pan head controller 12, of the pan speed data that the pan head controller 12 transmits as a control signal, the value of the pan speed used for calculation of the shift amount shift can be determined. The value of the pan speed used for calculation of the shift amount shift may be a value of the pan speed that the CPU 54 commands to the pan head controller 12 or may be a actually measured value of the pan speed given by the velocity detecting sensor in the pan head 10. On the other hand, acquisition, from the pan head controller 12, of the value of the control voltage of zooming that the pan head controller 12 transmits to the lens device 44 as a control signal (hereinafter the control voltage of zooming being referred to merely as control voltage) can notify the focal distance, and can determine the value of the picture angle (horizontal picture angle) used for calculation of the shift amount shift. However, the relationship between the control voltage and the focal distance depends on the kind of the lens device 44, and therefore in order to enable calculation of accurate shift amount for various kinds of lens devices, it is necessary to register in advance into a memory the characteristic data corresponding with kinds of lens device (a data table showing relationship between the control voltage and the focal distance) so that the characteristic data corresponding with kinds of lens device are used to give the focal distance from the control voltage.

In addition, the shift amount shift might not be theoretically given with the above described equation (1) but an accurate shift amount shift for each value of the pan speed as well as the control voltage can be given in advance before commencement of following etc. by way of actual measuring. In this case, for example, if the relationship between the pan speed acquired from the pan head controller 12 and the shift amount shift for each value of the control voltage is stored in the memory as the shift amount data as shown in FIG. 13, at the time of following processing, the pan speed acquired from the pan head controller 12 and the shift amount shift for the control voltage are read out from the memory so that based hereon the comparative frame can be set. At the time of following in general, zooming (focal distance) of the lens device 44 is not changed, and therefore it will be enough if before commencement of following the value of the shift amount shift toward the focal distance at the time of following toward each value of the pan speed is obtained by way of actual measurement and is stored in the memory as the shift amount data.

FIG. 14 is a flow chart showing the processing procedure in the case where the shift amount shift toward the predetermined focal distance and pan speed is obtained by way of actual measurement. It is necessary that no moving objects exist within the shooting range of the camera 40 during execution of this processing. However, even if a moving object exists, if that moving object is small for the screen, there will not be any problem. At first, the CPU 54 initializes with setting to the maximum value (for example 0×ffffff) for the parameter minarea, 1 for the parameter i and 0 for the shift amount shift given as the shift amount data (Step S100). Subsequently, the CPU 54 sets the pan speed of the pan head 10 to be commanded to the pan head controller 12 to a predetermined speed (pan speed with which the shift amount shift is being obtained) and transmits to the pan head controller 12 the command signal to command that pan speed (Step S102). In addition, it is determine whether or not the current pan speed of the pan head 10 given from the pan head controller 12 has reached the pan speed that the CPU 54 commanded (Step S104), and in case of the determination YES, the state goes forward to the next processing.

Next, the image processing processor 52 takes into the image memory 50 the image data (this image is regarded as the image #1) for one frame as in Step S10 to Step S14 in the above described FIG. 3 (Step S106), and subsequently after time for 4 fields has lapsed (Step S108), further takes into the image memory 50 the image data (this image is regarded as the image #2) for one frame (Step S110).

As described above, when image data for two frames are stored in the image memory 50, the CPU 54 supposes i as the temporal shift amount shift' in the shooting range of the image #2 against the shooting range of the image #1, and, based on that the shift amount shift', set the comparative frame of the image #1 and the image #2 (Step S112). And the comparative frame thereof is designated to the image processing processor 52.

As described above, when the CPU 54 sets the comparative frame and that comparative frame is designated to the image processing processor 52, the image processing processor 52 as well as the CPU 54 subsequently execute the processing similar to the processing from Step S22 to Step S28 in FIG. 3 in the following Step S114 to Step S120. At first, the image processing processor 52 extracts the image inside the comparative frame respectively from the image #1 and the image #2 so that the difference image of the image #1 and the image #2 is given by that extracted image (|#1-#2|) (Step S114). Subsequently, the image processing processor 52 binary-codes the image data of each pixel of the difference image (Step S116). In addition, the binary coded difference image undergoes shrink processing so that small noises are removed (Step 118).

Subsequently, the image processing processor 52 gives the total number of pixels with 1 being the pixel value based on the difference image so as to give the area thereof (Step S120). In addition, the obtained area is given to the CPU 54. If the temporal shift amount shift' set in the above described Step S112 appropriately corresponds with the pan speed, the area given here will ideally become 0.

The CPU 54 acquires the above described area from the image processing processor 52 so as to substitute the parameter area with that area (Step S122) and to judge whether or not the value of the area is smaller than the above described parameter minarea, that is, whether or not (minarea>area) (Step S124). If determination is YES, the minarea is substituted with the value of area (Step S126) and the value of the shift amount shift being finally demanded will be taken as i (however, not yet determined). On the other hand, in case of NO determination in Step S124, the processing of Step S126 and Step S128 will not be executed. Subsequently, the CPU 54 increases the value of i by 1 (Step S130) to judge whether or not i is larger than the pixel number in the horizontal direction (horizontal resolution) of the screen (Step S132). In case of NO determination, the state goes back to the processing of Step S112. This executes the processing from Step S112 to Step S132 repeatedly and the shift amount shift' used for setting the comparative frame when the area calculated in Step S120 becomes minimum shift'=i is determined as the shift amount shift obtained as the shift amount data with the processing in Step S128. In case of YES determination in Step S132, the above described processing will come to an end. If the above described processing is executed with changes in pan speed set in Step S102, the shift amount shift for each value of pan speed can be given, and moreover with changes in focal distance, the shift amount shift for each value of the pan speed as well as the focal distance can be given.

Thus, the shift amount shift is given not with theoretic values using the above described equation (1) but with actual measurement so that an accurate shift amount shift can be given in the case where there is dispersion in the pan speed of the actual pan head 10 against the pan speed of the pan head 10 acquired from the pan head controller 12, and in addition also in the case where there is dispersion in the focal distance of the lens device 44 against the control voltage. Actually, it is assumed that there is dispersion in pan speed or focal distance due to difference in environments or characteristics of individual product, and therefore such a method of giving the shift amount shift is effective for more accurate following. Such a method to determine the shift amount shift by way of actual measurement can be arranged for execution during following prior to commencement of following. That is, in the setting of the comparative frame in Step S20 as well as Step S36 in the flow chart in FIG. 3, the processing in the above described Step 112 to Step 132 is executed and the optimum shift amount shift is given by actual measurement. And the comparative frame can also be set based on that shift amount shift. In addition, in this case, since there is the case where the shift amount shift cannot be given when the moving object is large for the screen, the shift amount shift may be finally arranged to be determined by way of actual measurement in terms of complementing the shift amount shift theoretically given with the above described equation (1) as in FIG. 3 so that the shift amount shift may be given even when the moving object is large for the screen. That is, at first, the shift amount shift is calculated with the above described equation (1), and with that shift amount shift as a reference, the shift amount shift is increased/decreased one by one so that the comparative frame is set and at the same time, based on that comparative frame, the difference image is given so that the area of the moving object is calculated. If that area is smaller than the case of the shift amount shift calculated by the above described equation (1) and the shift amount shift that becomes minimum for the first time is detected, that shift amount shift is taken as an optimum shift amount shift and the comparative frame is set based on that shift amount shift.

Next, the processing to prevent the moving object from getting out of the screen when the moving speed of the moving object on the screen is fast will be described. It is assumed that the moving object moves only in the pan direction, and the movement involving movement of the moving object in the tilt direction shall be executed as in the following processing. As described in the flow chart in FIG. 3, it is supposed that comparison (acquisition of difference images) of the image #1 with the image #3 as well as of the image #1 with the image #2 taken in into image memory 50 causes the images M1, M2 and M3 of the moving object to be extracted on the screen of the image #1 within the shooting range L as shown in FIG. 15 and the center of gravity 1-3 and the center of gravity 1-2 were obtained. If the moving speed of the moving object on the screen is fast, that is, the movement amount of the moving object expressed with (the center of gravity 1-3)–(the center of gravity 1-2) is large, the moving object could get out of the screen (shooting range L) as shown in the image M4 in the above described drawing while the processing such as calculation of the center of gravity and the like is going on, and detection of the moving object thereafter is likely to become no longer executable.

In order to prevent such an event, it is suitable that the zooming of the lens device 44 of the camera 40 is controlled and the shooting range (picture angle) is made to expand automatically against the shooting range L of the image #1 so as to contain the image M4 of the moving object as in the shooting range L' in FIG. 15. Under the circumstances, in case of execution of such control, at first the CPU 54 predicts movement of the moving object based on the coordinates of the center of gravity 1-3 and the center of gravity 1-2 and judges whether or not the moving object is likely to get out the screen. As a simple method, the movement amount ((the center of gravity 1-3)–(the center of gravity 1-2)) of the moving object on the screen is calculated and in the case where that the movement amount is determine to be larger than a predetermined value, it is determine that the moving object is likely to get out of the screen. However, determination is not always made in terms of the movement amount of the moving object but positions of the center of gravity 1-3 or the center of gravity 1-2 may be considered. In addition, determination is made by another method. In addition, when the moving object is determine to be likely to get out of the screen, a command signal is transmitted to the pan head controller 12 to command a change to a predetermined focal distance to move zooming of the lens device 44 for a predetermined amount toward the wide side. This gives the control signal for zooming to the lens device 44 from the pan head controller 12 and the focal distance of the lens device 44 is changed to the focal distance commanded by the CPU 54 and the shooting range of the camera 40 is enlarged.

Figure 17:
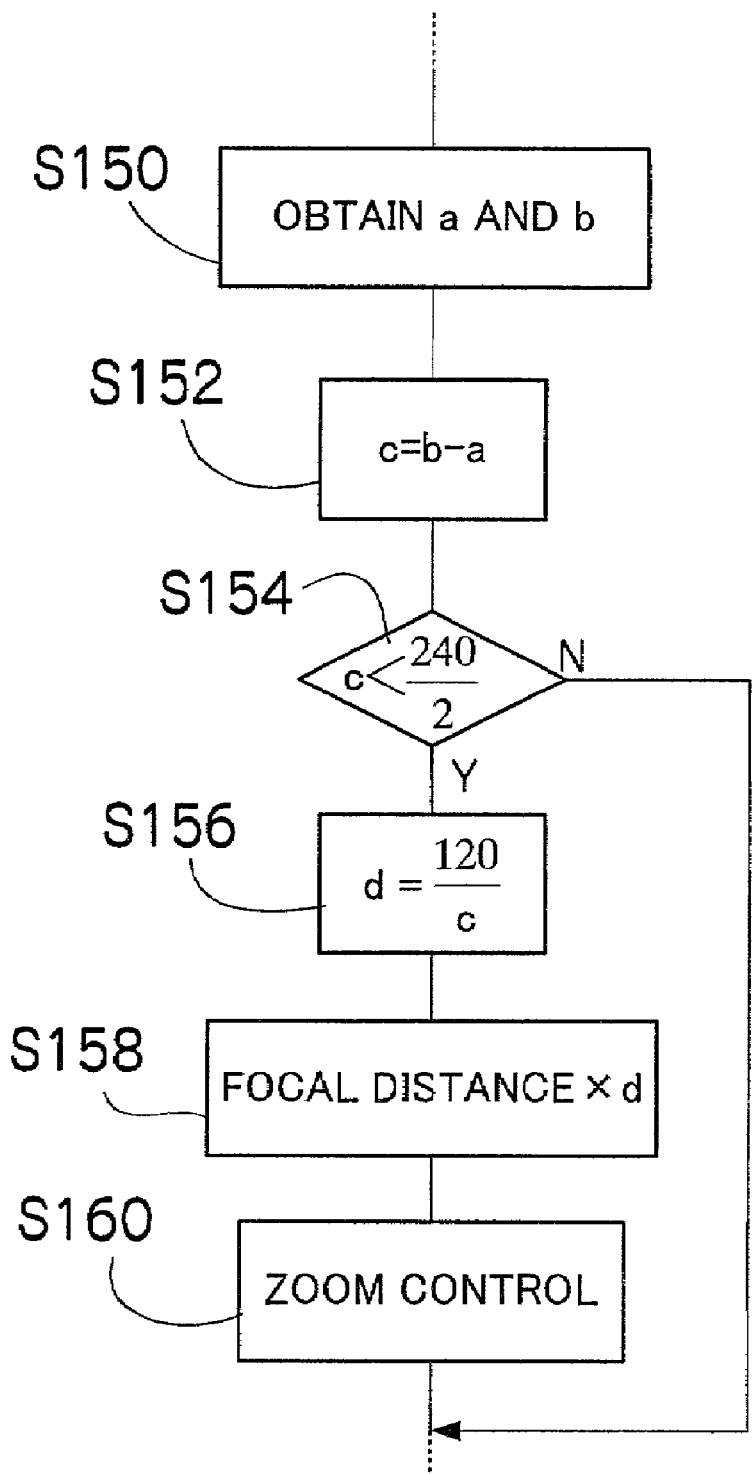
FIG. 17 is a flow chart of processing in the case where the shooting range is de-magnified.

On the other hand, zoom control only to enlarge the shooting range (picture angle) is likely to execute following under the state that the image of the moving object on the screen becomes unnecessarily small, and therefore it is suitable that the zooming of the lens device 44 is appropriately controlled so as to automatically shrink (move zooming toward the tele side) the shooting range (picture angle). Therefore, in case of such control the image processing processor 52 as well as the CPU 54 executes processing that will be described by an explanatory view in FIG. 16 and a flow chart in FIG. 17 as follows. However, in the case that as described above the moving object is determine to be likely to get out of the screen, the following processing to reduce the shooting range should not be executed. Firstly, in the processing of the flow chart in the above described FIG. 3, the difference image is given based on the image covering any two frames of the image #1 and the image #3 or the image #1 and the image #2, and when the image of the moving object is extracted, the range of them image of that moving object inside the screen is detected. For example, in the difference image of the image #1 and the image #3, it is supposed that the image of the moving object as in FIG. 16(A) has been extracted. The image processing processor 52 counts number of pixels with the pixel data being 1 (pixel data being not 0) for each horizontal line in that difference image. Each horizontal line is expressed with coordinate values in the perpendicular direction (reference should be made to FIG. 6) that will consist of 1 to Y (Y is for example 240) with 1 being allocated to the upper end of the screen. This gives the projection distribution in the perpendicular direction of the moving object as in FIG. 16(B). As shown in the flow chart in FIG. 17, the CPU 54 gives the coordinate value a of the upper end of the moving object and the coordinate value b of the lower end from the projection distribution in the perpendicular direction of the moving object (Step S150). Subsequently, the length c in the perpendicular direction of the moving object is calculated with c=b−a from the coordinate value a and the coordinate value b (Step S152). In addition, that length c is determine whether or not to be smaller than a half of the length of the screen in the perpendicular direction (being 240 here), that is whether or not c<240/2 (Step S154). In case of NO, the processing to reduce the shooting range is not executed in the assumption that the image of the moving object is sufficiently large on the screen. On the other hand, in case of YES, the image of the moving object is determine to be small on the screen and at first d=240/2/c=120/c is calculated. d is a value indicating how many times the image of the moving object having length c should be multiplied to reach a half of the length of the screen. Subsequently, the CPU 54 multiplies the currently set focal distance with the value d (Step S158) and will adopt that value as the new focal distance. Here, with d>1, the value of the new focal distance is larger than the value of the original focal distance, and the shooting range by way of this new focal distance will be shrunk. In addition, the CPU 54 transmits to the pan head controller 12 the command signal to command the change to that new focal length. This gives the control signal for zooming to the lens device 44 from the pan head controller 12 and the focal distance of the lens device 44 is changed to the focal distance commanded by the CPU 54 and the shooting range of the camera 40 is shrunk (Step S160). Accordingly, the image of the moving object is enlarged on the screen.

The method of obtaining the coordinate values a and b in the above described Step S150 may be a method other than the method based, as described above, on the projection distribution in the perpendicular direction.

Figure 18:
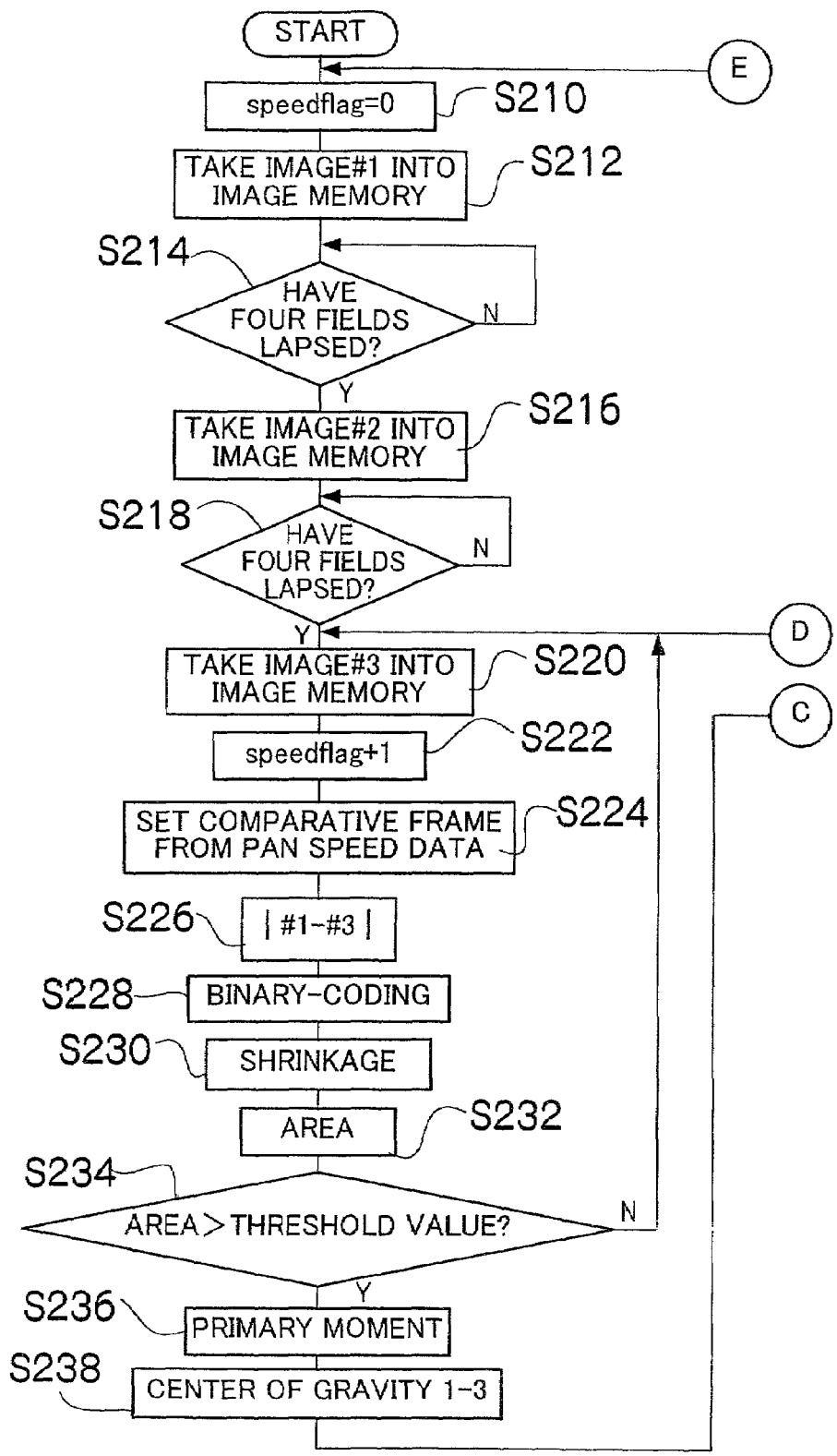
FIG. 18 is a flow chart of the second embodiment on processing procedure of following.
Figure 18:
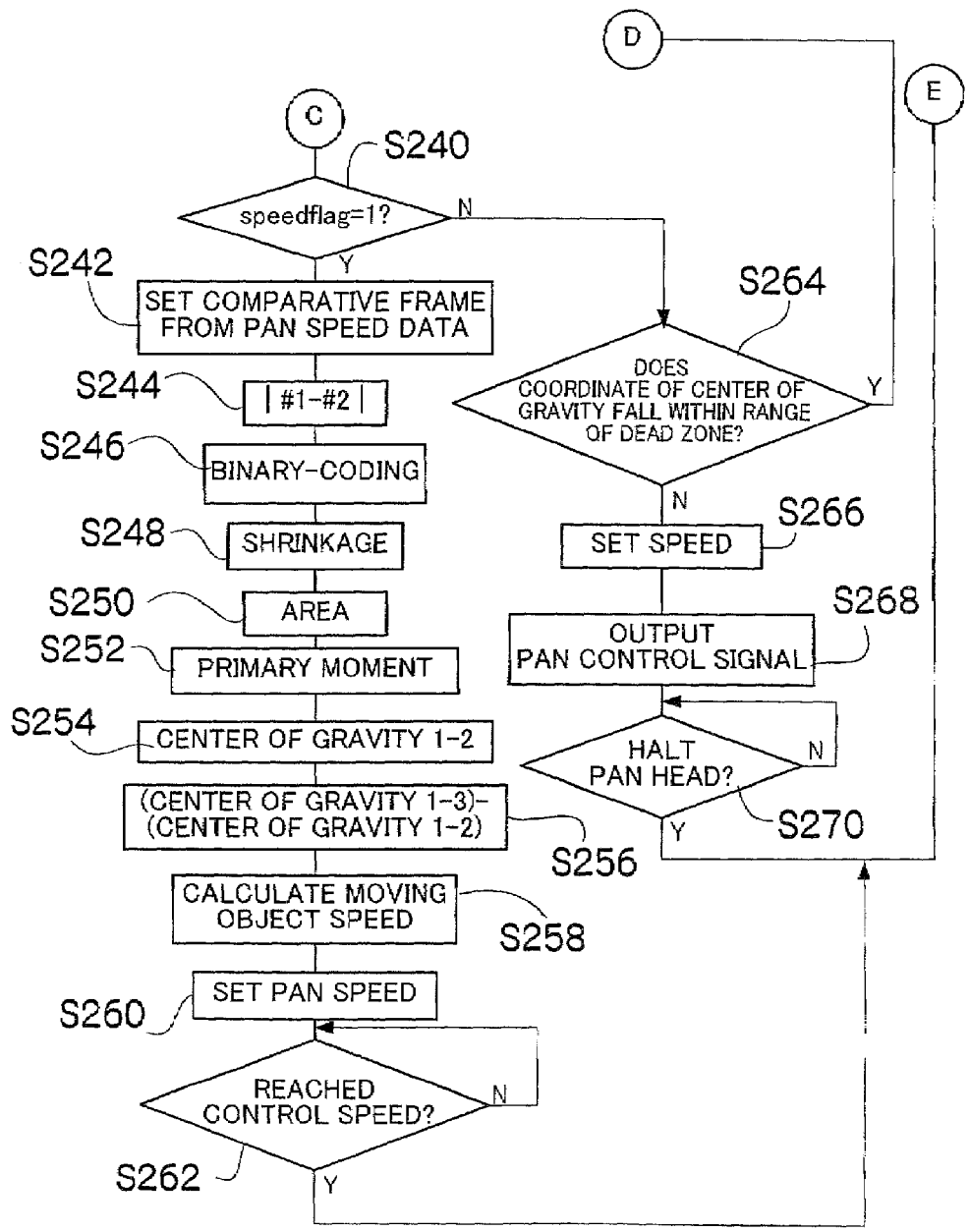

The second embodiment of processing contents of the image processing processor 52 as well as the CPU 54 of the image processing device 14 will be described based on the flow chart in FIG. 18. For the flow chart in FIG. 18 as well as description hereunder, mainly processing related to movement in the panning direction of the pan head 10 will be shown, but also for movement in the tilting direction the likewise processing as in the panning direction shall be made.

At first, the CPU 54 set the parameter speedflag used for later described judging processing to 0 (Step S210). On the other hand, the image processing processor 52 takes the image data (this image is regarded as image #1) for one frame obtained from the camera main body 42 of the camera 40 via the Y/C separating circuit 46 and the A/D converter 48 into the image memory 50 (Step S212).

Subsequently, the image processing processor 52 judges whether or not time for 4 fields ($1/59.94$ seconds per field) has lapsed with the synchronization signal given by the Y/C separating circuit 46 (Step S214), and when the time for 4 fields has lapsed, takes into the image memory 50 the image data (this image is regarded as the image #2) for one frame as in case of the image #1 (Step S216).

Moreover, the image processing processor 52 judges whether or not time for 4 fields ($1/59.94$ seconds per field) has lapsed with the synchronization signal given by the Y/C separating circuit 46 (Step S218), and when the time for 4 fields has lapsed, takes into the image memory 50 the image data (this image is regarded as the image #3) for one frame as in case of the image #1 and the image #2 (Step S220).

As described above, when image data for three frames are stored in the image memory 50, the CPU 54 increases the value of the above described speedflag by 1 (Step S222). In addition, it acquires the focal distance (picture angle) of the present camera 40 (lens device 44) as well as the moving speed of the pan head 10 from the pan head controller 12, and based hereon the comparative range (comparative frame) of the image #1 and the image #3 are set and the comparative frame thereof is designated to the image processing processor 52 (Step S224). The data on the moving speed used for setting of the comparative frame may not be acquired from the pan head controller 12 but may be data on the moving speed that the CPU 54 commanded to the pan head controller 12 as described later.

When the comparative frame is set by the CPU 54 as described above, and that comparative frame is indicated to the image processing processor 52, the image processing processor 52 subsequently extracts the image inside the comparative frame respectively from the image #1 and the image #3 so that the difference image of the image #1 and the image #3 is given by that extracted image (Step S226). That is, from the image data inside the comparative frames of the image #1 and the image #3, the difference of the pixel values of the pixels in the corresponding positions (pixels existing in the same position in the comparative frame) is given and that absolute value (|#1-#3|) is given. This causes only images of the moving object to be extracted as in the above described FIG. 5 and FIG. 8, and that moving object is recognized as the subject to be followed.

Subsequently, the image processing processor 52 binary-codes the image data of each pixel of the difference image given by Step S226 (Step S228). This processing will ideally give rise to 1 as the pixel value of the image of the moving object and 0 otherwise. In addition, the binary coded difference image undergoes shrink processing so that small noises are removed (Step S230). The difference image subject to binary coding and shrink processing will be referred to merely as difference image below.

Subsequently, the image processing processor 52 gives the total number of pixels with 1 being the pixel value based on the difference image so as to give the area of the entire image of the moving object (hereinafter referred to merely as the area of the moving object) (Step S232). The examples in FIG. 5 and FIG. 8 give the area of two circles indicating images before and after movement of the moving object. In addition, the obtained area is given to the CPU 54.

The CPU 54 acquires the area of the moving object from the image processing processor 52 so as to judge whether or not that area is larger than a predetermined threshold value (Step S234). Here, the case of NO determination is the case where the moving object so as to become an object for following does not exist, and in particular, NO determination is made in the case where the moving velocity of the moving object is slow. As the case where the moving velocity of the moving object is slow, even the case where an instant moving velocity is fast falls in this case when an average moving velocity within a certain time is slow. At this time, the state goes back to the above described Step S220 so that the processing is repeated again from acquisition of the image #3 to Step S234. At that time, the value of speedflag increases by 1 in Step S222. Thus, when the processing from Step S210 gives rise to NO determination even once in Step S234, that is, in the case where the moving velocity of the moving object is slow, the value of the speedflag is at least not less than 2, and if the determination is YES for the first time, that is, in the case where the moving velocity of the moving object is fast, the value of speedflag will become 1.

In case of YES determination in Step S234, that is, in the case where the moving object to become an object for following is detected from the difference image, the image processing processor 52 subsequently gives the primary moment over all the image of the moving object from the difference image (Step S236), and the primary moment is divided by the area of the moving object so that the center of gravity of the moving object is given (Step S238). Here, the center of gravity of the moving object is expressed, for example, with coordinates on the screen of the image #3, and the coordinate of that center of gravity is given to the CPU 54. The center of gravity of the moving object given by the image #1 and the image #3 will be expressed with the center of gravity 1-3 below.

Next, the CPU 54 judges whether or not the above described speedflag is 1 (Step S240). As described above, in the case where the moving velocity of the moving object is fast, speedflag is 1, giving rise to YES determination, and in the case where the moving velocity of the moving object is slow, speedflag is at least not 1, giving rise to NO determination. In case of NO, the pan head 10 is controlled in consideration of later described dead zone, and in case of YES, the pan head 10 is controlled without consideration of the dead zone.

At first, for description of YES in Step S240, that is, of the case where the moving velocity of the moving object is determine to be fast, in this case, the CPU 54, that has set the comparative range (comparative frame) of the image #1 and the image #3 in the above described Step S224, likewise sets the comparative range (comparative frame) of the image #1 and the image #2 based on the focal distance (picture angle) of the present camera 40 (lens device 44) as well as the moving speed of the pan head 10 and that comparative range is designated to the image processing processor 52 (Step S242). In addition, the image processing processor 52 as well as the CPU 54, that has given the center of gravity of the moving object from the image #1 and the image #3 in the above described Step S226 to Step 238 (with exclusion of S234), likewise gives the center of gravity of the moving object from the image #1 and the image #2 (Step S244 to Step S254). The center of gravity of the moving object given by the image #1 and the image #2 will be expressed with the center of gravity 1-2 below.

Here, FIG. 11 depicts relationship between the subject and the respective shooting ranges of the image #1, the image #2 and the image #3 in the case for example where the pan head 10 moves rightward (in the case where the shooting range is shifted rightward), and the shift amounts shift1 and shift2 of the shooting ranges respectively of the image #2 and the image #3 against the shooting range of the image #1 are respectively calculated with the above described (1). The pan speed of the pan head 10 while the image #1 to the image #3 are taken in is understood to be approximately constant, and in case of YES determination in the above described Step S240, the image #1 to the image #3 are shot in an equal interval, and therefore the shift amount shift1 will become a half amount of the shift amount shift2. In addition, as described above, comparison (acquisition of difference images) of the image #1 with the image #3 as well as of the image #1 with the image #2 causes the images M1, M2 and M3 of the moving object to be extracted on the screen of the image #3 as shown in FIG. 12. Comparison of the image #1 with the image #3 causes the image M1 and the image M3 to be extracted while comparison of the image #1 with the image #2 causes the image M1 and the image M2 to be extracted. With thus extracted images of the moving object, the center of gravity 1-3 as well as the center of gravity 1-2 of the above described moving object is calculated as a position indicated with '+' in the drawing on the screen of the image #3.

When the center of gravity 1-3 as well as the center of gravity 1-2 is given as described above, the CPU 54 gives difference between these the center of gravity 1-3 and the center of gravity 1-2, that is, (the center of gravity 1-3)–(the center of gravity 1-2) (Step S256), and based hereon calculates the moving speed of the moving object (Step S258).

Here, the moving object moves distance from the image M1 to the image M3 of the moving object, that is, quadruple distance of (the center of gravity 1-3)–(the center of gravity 1-2) on the screen, as in FIG. 12 during the elapsed time T (elapsed time covering eight fields=(1/59.94)×8) from the time when the image #1 is taken in (shooting time) to the time when the image #3 is taken in (shooting time), and therefore, with ΔL being (the center of gravity 1-3)–(the center of gravity 1-2), the moving speed v (unit: pixel/second) in the pan direction of the moving object on the screen is given by the following equation (2):

$$V = \Delta L \times 4 / T \qquad (2).$$

In addition, with R (unit: pixel) being resolution (horizontal resolution) of the image and A (unit: degree) being shooting picture angle (horizontal picture angle), the moving speed V (unit: degree/second) in the pan direction of the moving object in the actual space is given by the following equation (3):

$$V = v \times A / R \qquad (3).$$

When the moving speed in the tilt direction of the moving object is calculated, the resolution R is perpendicular resolution and the shooting picture angle A is a perpendicular picture angle indicating angle range in the perpendicular direction.

The CPU 54 calculates the moving speed V of the moving object as described above so as to transmit to the pan head controller 12 a command signal commanding movement in the pan direction of the pan head 10 with that moving speed V (Step S260). This controls the pan speed of the pan head 10 with the pan head controller 12. In addition, the CPU 54 judges whether or not the current moving speed (pan speed) of the pan head 10 given by the pan head controller 12 has reached the pan speed commanded by the above described CPU 54 (Step S262), and in case of YES determination, the state goes back to the above described step S210 so that the above described processing is repeated.

On the other hand, for description in case of NO in the above described Step S240, that is, in the case where the moving velocity of the moving object is determine to be slow, the CPU 54 judges whether or not the coordinate of the center of gravity 1-3 of the moving object given in the above described Step S238 falls within the range of the dead zone set on the screen of the image #3 (Step S264). The dead zone is set to have a predetermined width in the central portion of the screen as depicted in the slanted line range P in FIG. 19. As the point a in FIG. 19, in the case where the center of gravity 1-3 falls within the range P of the dead zone, Step 264 gives rise to YES determination while as the point b in FIG. 19, in the case where the center of gravity 1-3 falls outside the range P of the dead zone, Step 264 gives rise to NO determination. The range P of the dead zone shown in FIG. 19 depicts the screen in the horizontal direction, and the dead zone in the perpendicular direction likewise may be set to have a predetermined width in the perpendicular direction in the central portion of the screen. In addition, the range of the dead zone is not limited to the case shown in FIG. 19, but, for example, the width thereof may be changed corresponding with the position of that the center of gravity 1-3 detected in the preceding time and the width of the dead zone may be enlarged so that the center of gravity 1-3 comes to the center of the screen as shown in FIG. 20.

If the above described Step S264 gives rise to NO, that is in the case where the center of gravity 1-3 is determine to fall outside the dead zone, the CPU 54 set a predetermined pan speed (Step S266), and transmits that pan speed and the coordinate value of the center of gravity 1-3 to the pan head controller 12. The pan head controller 12 gives the pan position of the pan head 10 based on the pan/tilt position of the present pan head 10 as well as the focal distance of the lens device 44 so that the center of gravity 1-3 given by the CPU 54 comes to the center of the screen and transmits the pan control signal to the pan head 10 and thereby moves the pan head 10 to that pan position at the pan speed given by the CPU 54 (Step S268). The CPU 54 judges by way of signal from the pan head controller 12 whether or not the pan head 10 halts (Step S270), and in the case where the pan head 10 halts, the state returns to the above described Step S210 so that the above described processing is repeated.

On the other hand, if Step S264 gives rise to YES, that is, in the case where the center of gravity 1-3 is determine to fall within the range of the dead zone, the pan head 10 is not moved but the state returns to the above described Step S210 so that the above described processing is repeated.

The above described processing controls the pan head 10 (control in the shooting direction of the camera 40) in consideration of the dead zone in the case where the moving velocity of the moving object is slow so that the swing of the screen that could hamper visibility of images is prevented. On the other hand the pan head 10 is controlled without consideration of the dead zone in the case where the moving velocity of the moving object is fast, and inconvenience that the moving object falls outside the screen with control of the pan head 10 in consideration of the dead zone will not take place.

In the above described processing, when the moving speed of the moving object is detected, the image #1 to the image #3 covering three frames were taken in so that comparison of the image #1 with the image #3 as well as of the image #1 with the image #2 would give two centers of gravity namely the center of gravity 1-3 and the center of gravity 1-2, but without limitation hereto, comparison of the image #1 with the image #2 as well as of the image #2 with the image #3 may give two centers of gravity so that the moving speed of the moving object is detected, and comparison of the image #1 to the image #4 covering four frames may be taken in so that comparison on two not-overlapped groups of images covering two frames each, for example, comparison of the image #1 with the image #2 as well as of the image #3 with the image #4 gives two centers of gravity to detect the moving speed of the moving object.

In addition, control of the pan head in the case where the moving speed of the moving object is fast or control of the pan head 10 when the moving object does not fall within the range of the dead zone in the case where the moving speed of the moving object is slow is not limited to the above described cases. For example, in the case where the moving speed of the moving object is fast, the moving speed of the moving object is given from the image #1 to the image #3 for three frames so that the moving speed of the pan head 10 is controlled by that moving speed, but as in the case where the moving speed of the moving object is slow, the center of gravity of the moving object may be given from the images for two frames and the pan head 10 may be controlled so that that center of gravity comes to the center of the screen.

The third embodiment of processing contents of the image processing processor 52 as well as the CPU 54 of the image processing device 14 will be described based on the flow chart in FIG. 21. For the flow chart in FIG. 21 as well as description hereunder, mainly processing related to movement in the panning direction of the pan head 10 will be shown, but also for movement in the tilting direction the likewise processing as in the panning direction shall be made.

Figure 3:
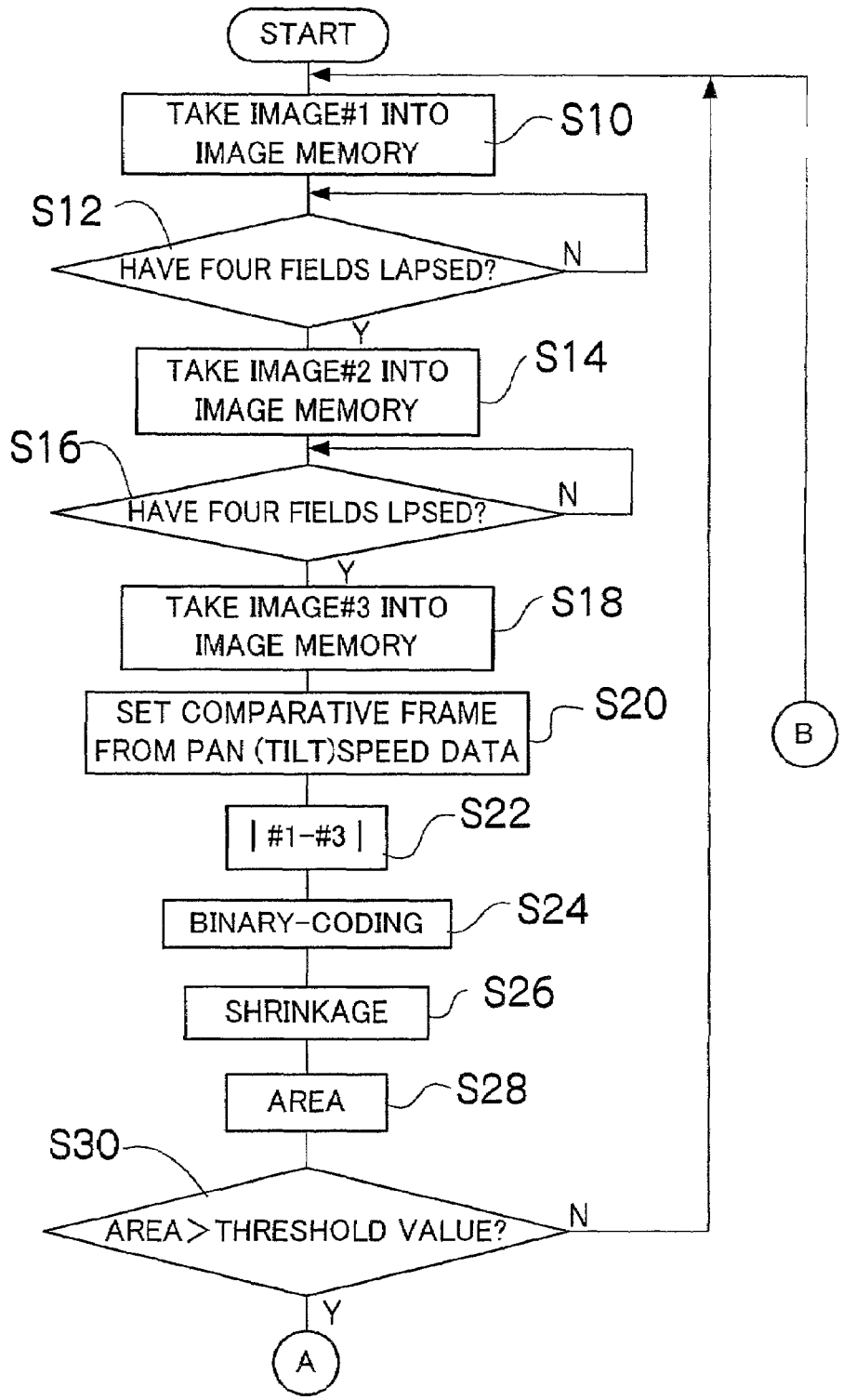
FIG. 3 is a flow chart of the first embodiment on processing procedure of following.
Figure 3:
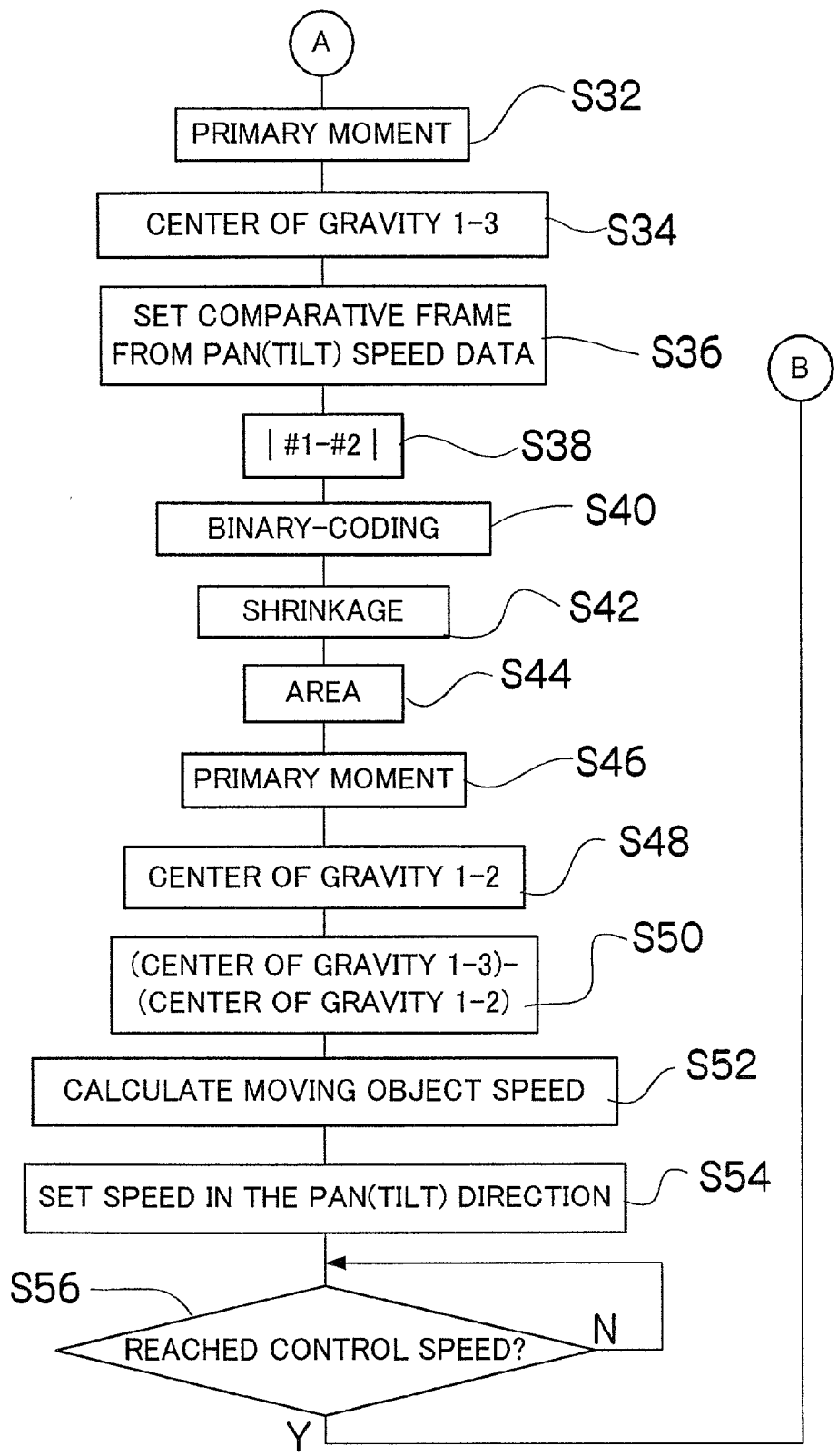
Figure 21:
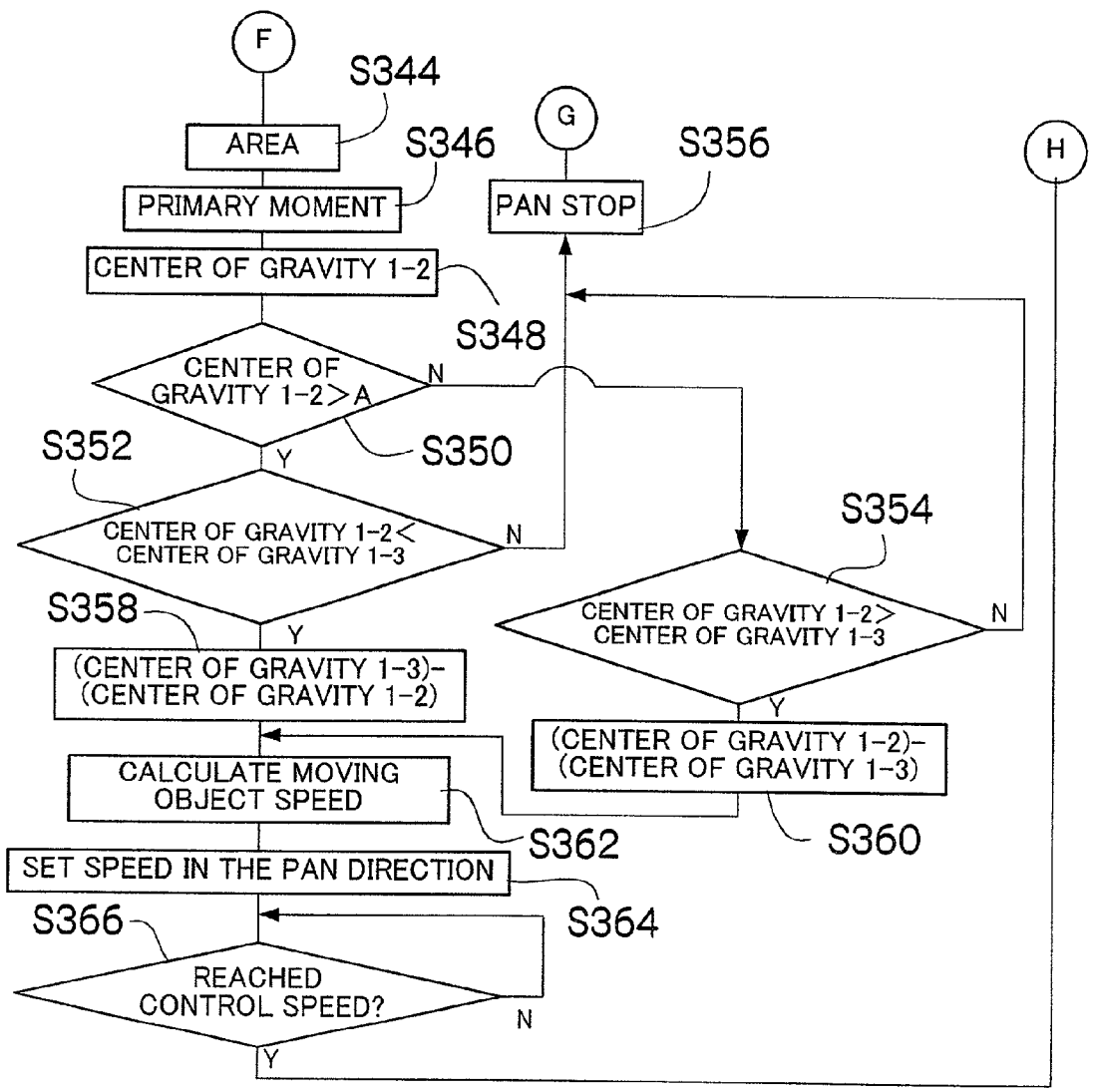
FIG. 21 is a flow chart of the third embodiment on processing procedure of following.

In the flow chart in FIG. 21, the processing from Step S310 to Step S348 is completely like the processing from Step S10 to Step S48 of the flow chart of the first embodiment described in FIG. 3, and therefore description thereon will be omitted.

The position on the screen of the center of gravity 1-3 as well as the center of gravity 1-2 in the processing up to S348 is given so that the CPU 54 selects the processing thereafter based on whether or not the moving object is moving toward the center of the screen. Here, patterns (A) to (D) in FIG. 22 depict positional relationship of the center of gravity 1-2 and the center of gravity 1-3 toward the center of the screen of the image #3, and on screens of respective patterns (A) to (D), the position indicated by coordinate value A denotes the center position of the screen in the horizontal direction, "+" symbol denotes the position of the center of gravity 1-2 or the center of gravity 1-3 and an arrow "→" or "←" denotes the direction of the center of gravity 1-3 against the center of gravity 1-2 and the moving direction of the center of gravity, that is the moving direction of the moving object. As depicted in these patterns (A) to (D), the positional relationship of the center of gravity 1-2 and the center of gravity 1-3 given in the above described Step S334 as well as Step S348 is classified with respect to the screen center into the case of being disposed in the right side of the screen (the pattern (A) as well as the pattern (B)) and the case of being disposed in the left side (the pattern (C) and the pattern (D)), and is also classified into the case where the moving direction of the center of gravity faces toward the outside of the screen (the pattern (A) and the pattern (C)) and the case where it faces toward the screen center (the pattern (B) and the pattern (D)). The case where the center of gravity 1-2 and the center of gravity 1-3 stretches over the both sides of the central coordinate value A shall be classified into the pattern (B) or the pattern (D) where the center of gravity 1-2 and the center of gravity 1-3 coexist in the side where the center of gravity 1-2 exists against the central coordinate value A.

By way of determination processing in Step S350 to Step S354 in FIG. 21, the CPU 54 at first classifies to which pattern the positional relationship of the center of gravity 1-2 and the center of gravity 1-3 given in the above described Step S334 as well as Step S348 belongs. Under the circumstances, in Step S350, it is determine whether or not coordinate value of the center of gravity 1-2 given in the above described Step S348 is larger than the above described central coordinate value A (the center of gravity 1-2>A), that is, the center of gravity 1-2 is disposed in the right side of the center of the screen. This determination makes YES determination in case of falling into the pattern (A) or the pattern (B) and makes NO determination in case of falling into the pattern (C) or the pattern (D) among the patterns (A) to (D) depicted in FIG. 22 as in FIG. 23(1).

In the case where Step S350 makes YES determination, the subsequent Step S352 judges whether or not the coordinate value of the center of gravity 1-2 is smaller than the coordinate value of the center of gravity 1-3 (the center of gravity 1-2<the center of gravity 1-3), that is, the moving direction of the center of gravity faces toward outside of the screen. This determination makes YES determination in case of falling into the pattern (A) as shown in FIG. 23(3) and makes NO determination in case of falling into the pattern (B) in the patterns (A) and (B) in FIG. 23(2). This judges to which of the pattern (A) or the pattern (B) the positional relationship of the center of gravity 1-2 and the center of gravity 1-3 given in the above described Step S334 and Step S348 belongs.

On the other hand, the case where Step S350 makes NO determination, the subsequent Step S354 judges whether or not the coordinate value of the center of gravity 1-2 is larger than the coordinate value of the center of gravity 1-3 (the center of gravity 1-2>the center of gravity 1-3), that is, the moving direction of the center of gravity faces toward outside of the screen. This determination makes YES determination in case of falling into the pattern (C) as shown in FIG. 23(3) and makes NO determination in case of falling into the pattern (D) in the patterns (C) and (D) in FIG. 23(2). This judges to which of the pattern (C) or the pattern (D) the positional relationship of the center of gravity 1-2 and the center of gravity 1-3 given in the above described Step S334 and Step S348 belongs.

When the determination processing of the above described Step 350 to Step S354 classifies to which pattern the positional relationship of the center of gravity 1-2 and the center of gravity 1-3 given in the above described Step S334 and the Step S348 belongs, the CPU 54 executes the processing corresponding with that pattern. At first, in case of NO determination in the above described Step S352 or the above described Step S354, that is, as shown in FIG. 23(3), in case of determination to fall into the pattern (B) or the pattern (D), the CPU 54 transmit to the pan head controller 12 a command signal to stop movement of the pan head 10 in the pan direction (to set the pan speed to 0). This halts the movement of the pan head 10 in the pan direction (Step S356). And the state returns to the processing of the above described Step S310. Thus, the case where the positional relationship of the center of gravity 1-2 and the center of gravity 1-3 falls into the pattern (B) and the pattern (D) in the case where the movement of the pan head 10 in the pan direction is halted is the case where the moving direction of the center of gravity is directed toward the center of the screen in any pattern, and the movement of the pan head 10 will halt, for example, when the moving object gets into the screen from outside the screen and when an object that stays still inside the screen starts movement toward the center of the screen and the like. In the case where the pan head 10 has not moved from the beginning, the pan head 10 is maintained under the state of staying still. Suppose the moving object goes over the center of the screen so that the positional relationship between the center of gravity 1-2 and the center of gravity 1-3 shifts from the state of the pattern (B) or the pattern (D) to the pattern (A) or the pattern (C), and from that point of time, as later described the pan head 10 starts moving corresponding with the moving speed of the moving object.

On the other hand, in the case where the CPU 54 makes YES determination in the above described Step S352 or the above described Step S354, that is, in case of determination to fall into the pattern (A) or the pattern (C) as shown in FIG. 23(3), the CPU 54 calculates the moving speed of the moving object as described later (Step S358, Step S360 and Step S362). This case is a case where the moving directions of the center of gravity both of the pattern (A) and the pattern (C) faces the outside of the screen, and the moving velocity of the pan head 10 is controlled corresponding with the moving speed of the moving object.

For description on calculation of the moving speed of the moving object, on the screen, the moving object moves distance from the image M1 to the image M3 of the moving object as in FIG. 12 during the elapsed time T (elapsed time covering eight fields ($\frac{1}{59.94}$)×8) from the time when the image #1 is taken in (shooting time) to the time when the image #3 is taken in (shooting time). That moving distance is quadruple distance of (the center of gravity 1-3)–(the center of gravity 1-2) in case of the moving direction of the center of gravity being rightward as in the pattern (A), and is quadruple distance of (the center of gravity 1-2)–(the center of gravity 1-3) in case of the moving direction of the center of gravity being leftward as in the pattern (C). Therefore, in the case where the CPU 54 makes YES determination in the above described Step S352, that is, in case of determination to fall into the pattern (A), it calculates (the center of gravity 1-3)–(the center of gravity 1-2) in Step S358. On the other hand, in case of YES determination in the above described Step S354, that is, determination to fall into the pattern (C), (the center of gravity 1-2)–(the center of gravity 1-3) is calculated in Step S360.

Subsequently, with ΔL being the value calculated in Step S358 or Step S360, the moving speed v (unit: pixel/second) in the pan direction of the moving object on the screen is given by the following equation (2):

$$V = \Delta L \times 4/T \qquad (2).$$

In addition, with R (unit: pixel) being resolution (horizontal resolution) of the image and A (unit: degree) being shooting picture angle (horizontal picture angle), the moving speed V (unit: degree/second) in the pan direction of the moving object in the actual space is given by the following equation (3):

$$V = v \times A/R \qquad (3).$$

When the moving speed in the tilt direction of the moving object is calculated, the resolution R is perpendicular resolution and the shooting picture angle A is a perpendicular picture angle indicating angle range in the perpendicular direction.

The CPU 54 calculates the moving speed of the moving object from the value of ΔL calculated in Step S358 or Step S360 with the above described equations (2) and (3) (Step S362).

As described above, the moving speed V of the moving object is calculated so that a command signal commanding movement in the pan direction of the pan head 10 with that moving speed V is transmitted to the pan head controller 12 (Step S364). The command signal naturally includes command contents to command the moving direction (pan direction is whether leftward or rightward) of the pan head 10 based on the moving direction of the moving object. This controls the pan speed of the pan head 10 with the pan head controller 12. In addition, the CPU 54 acquires the current moving speed (pan speed) of the pan head 10 from the pan head controller 12 to judge whether or not that moving speed has reached the pan speed commanded by the above described CPU 54 (Step S366), and in case of YES determination, the state goes back to the above described step S310 so that the above described processing is repeated.

So far, in the above described processing, the center of the screen, that is, the coordinate value A indicates the position to bisect the screen in the horizontal direction so as to halt the pan head 10 in the case where the moving object is moving toward the center of the screen, but the center of the screen may not be the position completely bisecting the screen.

So far, in the above described embodiments, control contents of following (processing of the image processing processor 52 and the CPU 54 etc.) to follow a moving object with a camera have been described in detail, but without being limited hereto, with control of following which might involve any aspect, the feature of the present invention, that is, when the moving object is moving toward the center of the screen, the control that the pan head 10 is halted in a compulsory fashion not to move shooting direction of the camera and is caused to move the shooting direction of the camera after the moving object goes over the center of the screen can be applied.

In addition, the control contents of the above described embodiments is applicable not only to the case where the pan head 10 moves in the pan direction and the tilt direction but also likewise applicable in case of movement in determined directions otherwise (such as in the case where the position of the camera is moved upward/downward/leftward/rightward).

As described above, according to the following device related to the present invention, the moving velocity of the moving object is detected, and the moving velocity of the pan head is controlled based on that moving velocity, and therefore the following performance of the pan head against movement of the moving object is improved so that the moving object will be able to be definitely followed. In addition, the comparative range for extracting the image of the moving object from the image taken in from the camera is determined based on the moving velocity of the pan head, and thereby inexpensive parts will be able to be used for determination compared with the case where the comparative range is determined based on the position of the pan head as described in Japanese Patent Application Publication No. 2000-175101. That is, the time interval to take in respective images covering two screens can be determined accurately, and that time interval is short, and therefore for example, resolution capability as well as accuracy of velocity detection for detecting that the shooting rage has shifted only by 1 pixel may be low compared with the case of position detection, and use of inexpensive sensors as well as A/D converter and the like will become possible. In addition, the images for two screens are arranged to be taken in while the moving velocity of the pan head is constant so that there will be no necessity that the timing when the image is taken in should be caused to accurately coincide with the timing when the moving velocity is detected and high accuracy on time will not become necessary, either. Moreover, without provision of a position detection sensor in the case where a stepping motor is used for pan/tilt operation, the comparative range will be able to be given from the moving velocity.

In addition, in the case where the moving velocity of the moving object is extremely fast and it is determine to go out of the shooting range of the camera, the shooting range of the camera is enlarged, that is, zoom is moved to the wide side so that the moving object with extremely fast moving velocity will be able to be followed without fail.

In addition, only in the case where the moving velocity of the moving object is slow, the shooting direction of the camera is controlled in consideration of the dead zone set on the shooting screen, and thus in the case where the moving velocity of the moving object is fast, inconvenience due to control of the shooting direction of the camera in consideration of the dead zone can be prevented, and the moving object can be followed appropriately with vision-friendly images.

In addition, in the case where the moving object is moving toward the center of the screen, the shooting direction of the camera was arranged not to move, and therefore, for example, when the moving object comes in from outside the shooting range of the camera to inside the shooting range, the shooting direction of the camera will follow the moving object and move after the moving object goes beyond the center of the screen, and thus without giving rise to inconvenience that the shooting direction of the camera moves uselessly, the image of the camera will become vision-friendly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A following device with a pan head on which a camera is mounted moving to move shooting directions of said camera while taking in images shot by said camera one after another so as to extract images of a moving object by comparing taken-in images and to control moving velocity of said pan head based on positions on a screen of images of said moving object so as not to dispose said moving object outside a shooting range of said camera, comprising:
   a moving object image extraction device to extract image of said moving object based on images taken in from said camera, the moving object image extraction device including:
      a comparative range determination device to take in images for two screens from said camera, and to determine a range where the shooting ranges of said camera corresponding to the images for said two screens overlap as a comparative range on the basis of the moving velocity of said pan head; and
      an image processing device to extract images inside the comparative range determined from the images for said two screens by said comparative range determination device and to extract images of said moving object by comparing the images extracted in the comparative range;
   a moving velocity detection device to detect moving velocity of said moving object from positional changes on the screen of images of said moving object extracted by said moving object image extraction device; and
   a control device to control moving velocity of said pan head based on the moving velocity of said moving object obtained by said moving velocity detection device so that said moving object does not get out of the shooting range.

2. The following device according to claim 1, wherein said control device enlarges the shooting range of said camera in a case where said moving object is determined to get out of the shooting range of said camera based on images of said moving object extracted by said moving object image extraction device.

* * * * *